United States Patent
Niitsuma

(10) Patent No.: US 9,253,969 B2
(45) Date of Patent: Feb. 9, 2016

(54) DUAL-BEARING REEL SPOOL BRAKING DEVICE AND DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

(*) Notice: Subject to any disclaimer, the term of this patent is extended or adjusted under 35 U.S.C. 154(b) by 41 days.

(21) Appl. No.: 14/181,928

(22) Filed: Feb. 17, 2014

(65) Prior Publication Data
US 2014/0263793 A1    Sep. 18, 2014

(30) Foreign Application Priority Data
Mar. 15, 2013 (JP) ................................. 2013-053359

(51) Int. Cl.
*A01K 89/01* (2006.01)
*A01K 89/0155* (2006.01)

(52) U.S. Cl.
CPC ................................. *A01K 89/0155* (2013.01)

(58) Field of Classification Search
CPC ................... A01K 89/0155; A01K 89/01557; A01K 89/056
USPC ......................................................... 242/289
See application file for complete search history.

(56) References Cited

U.S. PATENT DOCUMENTS

| 1,566,594 | A | * | 12/1925 | Graham | 242/289 |
| 4,390,140 | A | * | 6/1983 | Karlsson et al. | 242/289 |
| 5,865,387 | A | * | 2/1999 | Hirano | 242/289 |
| 5,934,588 | A | * | 8/1999 | Ylikangas | 242/289 |
| 5,996,921 | A | * | 12/1999 | Hogaki et al. | 242/289 |
| 6,254,021 | B1 | * | 7/2001 | Morimoto et al. | 242/289 |
| 6,364,230 | B1 | * | 4/2002 | Kawasaki | 242/289 |
| 6,474,580 | B1 | * | 11/2002 | Hirayama | 242/289 |
| 2012/0248233 | A1 | * | 10/2012 | Saito et al. | 242/289 |
| 2013/0181081 | A1 | * | 7/2013 | Niitsuma | 242/289 |

FOREIGN PATENT DOCUMENTS

JP         2013-86 A    1/2013

* cited by examiner

*Primary Examiner* — Emmanuel M Marcelo
(74) *Attorney, Agent, or Firm* — Global IP Counselors

(57) ABSTRACT

A dual-bearing reel spool braking device is configured to brake a spool that is rotatably mounted on a reel body by centrifugal force. The dual-bearing reel spool includes at least one brake shoe, a rotating member and a brake drum. The brake shoe is arranged to apply a braking force to the spool. The rotating member is configured to rotate in conjunction with the spool. The rotating member includes a pivot shaft portion and a fixing portion. The pivot shaft portion pivotally supports the brake shoe and that movably supports the brake shoe in an axial direction of the pivot shaft portion. The fixing portion engages the brake shoe and non-pivotally fixes the brake shoe. The brake drum is arranged to selectively contact the brake shoe.

12 Claims, 13 Drawing Sheets

DUAL-BEARING REEL SPOOL BRAKING DEVICE AND DUAL-BEARING REEL

CROSS-REFERENCE TO RELATED APPLICATIONS

This application claims priority to Japanese Patent Application No. 2013-053359, filed on Mar. 15, 2013. The entire disclosure of Japanese Patent Application No. 2013-053359 is hereby incorporated herein by reference.

BACKGROUND

1. Field of the Invention

The present invention generally relates to a dual-bearing reel spool braking device. More specifically, the present invention relates to a dual-bearing reel spool braking device that applies brakes to a spool that is rotatably mounted on a reel body. Additionally, the present invention relates to a dual-bearing reel that has a spool braking device.

2. Background Information

In a dual-bearing reel that is used for casting, in order to prevent backlash, a braking force is generally applied to the spool. A known spool braking device of this type is a spool braking device that applies brakes the spool using centrifugal force that is generated by the rotation of the spool, in which this braking force is adjustable from the outside of the reel body. However, backlash is generated when the rotational speed of the spool becomes faster than the line delivering speed during casting.

In a conventional spool braking device, a spool braking device that applies a braking force to a spool by pivoting a brake shoe and that has the brake shoe come into contact with the brake drum has been disclosed (refer to Japanese Laid-Open Patent Publication No. 2013-00086).

Specifically, in this spool braking device, the brake shoe pivots in conjunction with the rotation of the spool and comes into contact with the brake drum. More specifically, a bracket is fixed to the spool shaft, and a pin is installed on this bracket. The brake shoe is slidably mounted on this pin. With this, when the spool rotates, the brake shoe slides around the pin and comes into contact with the brake drum due to the centrifugal force. In this way, a braking force is applied to the spool. Additionally, a recess (a switching recess) is installed on the brake shoe, and a protrusion (a switching protrusion) is installed on the bracket. When the brake shoe is made inoperable, the recess of the brake shoe elastically engages with the protrusion of the bracket by sliding the brake shoe. With this, the position of the brake shoe is retained so that the brake shoe will not operate.

SUMMARY

In a conventional spool braking device, in the operable state of the brake shoe, the brake shoe slides around the pin and can come into contact with the brake drum. Additionally, when switching the brake shoe from the operable state to the inoperable state, the brake shoe is slid in the operable state position, and the recess of the brake shoe is elastically engaged with the protrusion of the bracket. In this case, with the centrifugal force that is generated by the rotation of the spool, the engagement of the recess of the brake shoe and the protrusion of the bracket will not become disengaged, so that the recess of the brake shoe and the protrusion of the bracket must be elastically engaged reliably. For this reason, when the user tries to switch the brake shoe from the inoperable state to the operable state, there was the risk that the elastic engagement of the recess of the brake shoe and the protrusion of the bracket becomes difficult to disengage. In other words, when trying to switch the brake shoe from the inoperable state to the operable state, there was the risk that elastically engaging the recess of the brake shoe and the protrusion of the bracket becomes difficult. Additionally, if there is moisture in the brake shoe or if there is a deposit adhered to the brake shoe, there is the risk that a greater-than-expected amount of centrifugal force will be applied to the spool and that the elastic engagement of the recess of the brake shoe and the protrusion of the bracket would become disengaged.

Meanwhile, by pivoting the brake shoe in the operable state position, the brake shoe and the bracket could be engaged with a hook, etc. However, even in that case, the same kind of problem as the above would occur.

The present invention was made in light of problems like those mentioned above. One object of the present invention is to facilitate the switch between the operable state and the inoperable state of the brake shoe as well as to stably operate the brake shoe in the operable state and to reliably fix the brake shoe in the inoperable state.

The dual-bearing reel spool braking device according to a first aspect applies brakes to the spool that is rotatably mounted on a reel body with centrifugal force. This spool braking device comprises at least one brake shoe to apply the brakes to the spool, a rotating member, and a brake drum. The rotating member rotates in conjunction with the rotation of the spool. The rotating member comprises a pivot shaft portion and a fixing portion. The pivot shaft portion pivotally supports the brake shoe as well as movably supports the brake shoe in the pivot shaft direction. The fixing portion engages with the brake shoe and non-pivotally fixes the brake shoe. At least a part of the brake drum is in contact with the pivoting brake shoe.

In the present spool braking device, by moving the brake shoe in a pivot shaft direction that is different from the direction in which the centrifugal force acts, the device can be engaged with the fixing portion of the rotating member. With this, the brake shoe can be non-pivotally fixed. Meanwhile, the brake shoe can be swung by releasing the engagement of the brake shoe and the fixing portion of the rotating member. In this way, by moving the brake shoe in a pivot shaft direction that is different from the direction in which the centrifugal force acts, the brake shoe can be easily switched between the operable state and the inoperable state. Additionally, since the brake shoe can be easily switched between the operable state and the inoperable state by moving in a pivot shaft direction that is different from the direction in which the centrifugal force acts, the device can be stably operated in the operable state; even if a greater-than-expected amount of centrifugal force is applied to the spool in the inoperable state, the device can be reliably fixed.

A dual-bearing reel spool braking device according to the second aspect comprises the device recited in the first aspect, with the brake shoe being movable along the pivot shaft portion between the pivoting position, in which the pivoting of the brake shoe is permitted, and the non-pivoting position, in which the brake shoe engages with the fixing portion.

In this case, by moving the brake shoe along the pivot shaft portion, the brake shoe can be disposed in the pivoting position and the non-pivoting position. With this, the brake shoe can be swung in the pivoting position, and the brake shoe can be non-pivotally fixed in the non-pivoting position. In other words, by installing an operable state position of the brake shoe (a pivoting position) and an inoperable state position of the brake shoe (a non-pivoting position), the brake shoe can be stably operated in the pivoting position and can be reliably fixed in the non-pivoting position.

A dual-bearing reel spool braking device according to the third aspect comprises the device recited in the first or second aspect, with either the brake shoe or the rotating member comprising a first guide part for pivoting, which guides the pivoting of the brake shoe. The other component, either the brake shoe or the rotating member, comprises an engaging section for pivoting, which engages with and is guided by the first guide part for pivoting.

In this case, since the engaging section for pivoting engages with and is guided by the first guide part for pivoting, the brake shoe can be stably swung. In other words, the brake shoe can be stably operated in the operable state.

A dual-bearing reel spool braking device according to the fourth aspect comprises in the device recited in the third aspect, with the rotating member comprising a second guide part for moving that guides the movement of the brake shoe in the pivoting direction. The engaging section for pivoting can engage with the second guide part for moving when the brake shoe is disposed in a predefined pivoting angle.

In this case, since the engaging section for pivoting engages with and is guided by the second guide part for moving, the brake shoe can be stably moved along the pivoting shaft. In other words, the brake shoe can be stably moved between the operable state and the inoperable state. With this, the brake shoe can be easily switched between the operable state and the inoperable state.

Additionally, the engaging section for pivoting will engage with and be guided by the second guide part for moving only when the brake shoe is disposed in a predefined pivoting angle. For this reason, the brake shoe can be regulated so as to not move from the pivoting position to the non-pivoting position, contrary to user intentions, when the brake shoe is in the operable state. In other words, the brake shoe can be stably operated in the operable state.

A dual-bearing reel spool braking device according to the aspect invention comprises in the device recited in the fourth aspect, with either the brake shoe or the rotating member comprising a movement regulation section. The movement regulation section engages with the engaging section for pivoting and regulates the movement of the brake shoe when the brake shoe engages with the fixing portion.

In this case, by moving the brake shoe along the pivot shaft portion, the brake shoe engages with the fixing portion, and an engaging section for movement regulation engages with the movement regulation section. With this, the pivoting of the brake shoe can be regulated by the fixing portion, and the movement of the brake shoe in the pivot shaft direction can be regulated by the engaging section for pivoting and the engagement of the movement regulation section. With this, the brake shoe can be more reliably fixed in the operable state. Further, the user can confirm that the brake shoe is in the inoperable state with a click feeling when engaging the engaging section for movement regulation to the movement regulation section.

A dual-bearing reel spool braking device according to the sixth aspect comprises the device recited in any one of the first through the fifth aspects, with either the brake shoe or the fixing member comprising a protrusion that is essentially parallel with the pivot shaft portion. The other component, either the brake shoe or the fixing portion, comprises a recess that engages with the protrusion.

In this case, by moving the brake shoe along the pivot shaft portion and engaging the protrusion with the recess, the brake shoe is non-pivotally fixed. With this, the brake shoe can be reliably fixed in the inoperable state.

A dual-bearing reel spool braking device according to the seventh aspects comprise the device recited in any one of the first through the fifth aspects, with either the brake shoe or the fixing member comprising a protrusion that is essentially parallel with the pivot shaft portion. The other component, either the brake shoe or the fixing portion, comprises a hole that engages with the protrusion.

In this case, by moving the brake shoe along the pivot shaft portion and engaging the protrusion with the hole, the brake shoe is non-pivotally fixed. With this, the brake shoe can be reliably fixed in the inoperable state.

A dual-bearing reel spool braking device according to the eighth aspect comprises the device recited in any one of the first through the seventh aspects, with the pivot shaft portion extending in a direction that crisscrosses with the rotational axis of the rotating member or in a direction that follows the rotational axis of the rotating member.

In this case, the pivot shaft portion is installed on the rotating member to extend in a direction that crisscrosses with the rotational axis of the rotating member or in a direction that follows the rotational axis of the rotating member. In this way, even if the pivot shaft portion is installed on the rotating member, the brake shoe can come into contact with the brake drum. In other words, the brake shoe can be in contact with the brake drum in various forms, according to the design of the dual-bearing reel. Additionally, in this case, since the pivot shaft portion is formed extending in a direction that is different from the direction in which the centrifugal force acts, that is, the direction that crisscrosses with the rotational axis of the rotating member, or in a direction that follows the rotational axis of the rotating member, the same effect as the above can be obtained.

A dual-bearing reel spool braking device according to the ninth aspect comprises the device recited in any one of the first through the seventh aspects, with the pivot shaft portion extending in a direction that crisscrosses with the rotational axis of the rotating member. The brake shoe comes into contact with the brake drum in a state in which at least a part of the brake shoe is pressed by the rotating member in a pivoting position that permits the pivoting of the brake shoe.

In this case, when the brake shoe comes into contact with the brake drum, at least a part of the brake shoe is pressed by the rotating member, so that the brake shoe can be regulated so as not move from the pivoting position to the non-pivoting position in the operable state of the brake shoe.

The dual-bearing reel according to the tenth aspect comprises the spool braking device as recited in any one of the first through the ninth aspects. The present dual-bearing reel comprises the above-described spool braking device. With this, the same effects as the above can be obtained with the present dual-bearing reel as well.

According to the present invention, the brake shoe can be easily switched between the operable state and the inoperable state. Additionally, the brake shoe can be stably operated in the operable state and can be reliably fixed in the inoperable state.

Other objects, features, aspects and advantages of the disclosed dual-bearing reel spool braking device will become apparent to those skilled in the art from the following detailed description, which, taken in conjunction with the annexed drawings, discloses preferred embodiments of the dual-bearing reel spool braking device.

BRIEF DESCRIPTION OF THE DRAWINGS

Referring now to the attached drawings which form a part of this original disclosure.

DETAILED DESCRIPTION OF EMBODIMENTS

Figure 1:
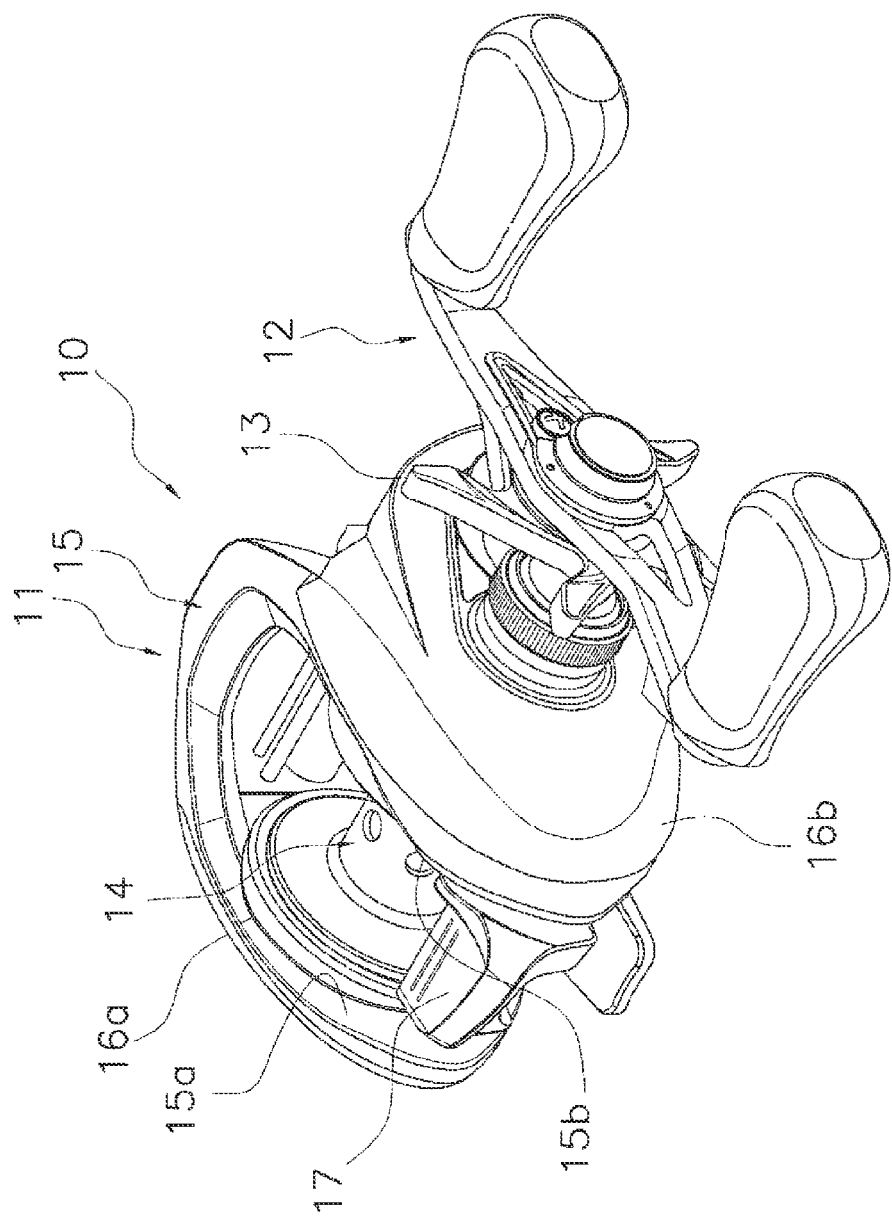
FIG. 1 is a cross-sectional diagram of a dual-bearing reel according to the first embodiment of the present invention.
Figure 2:
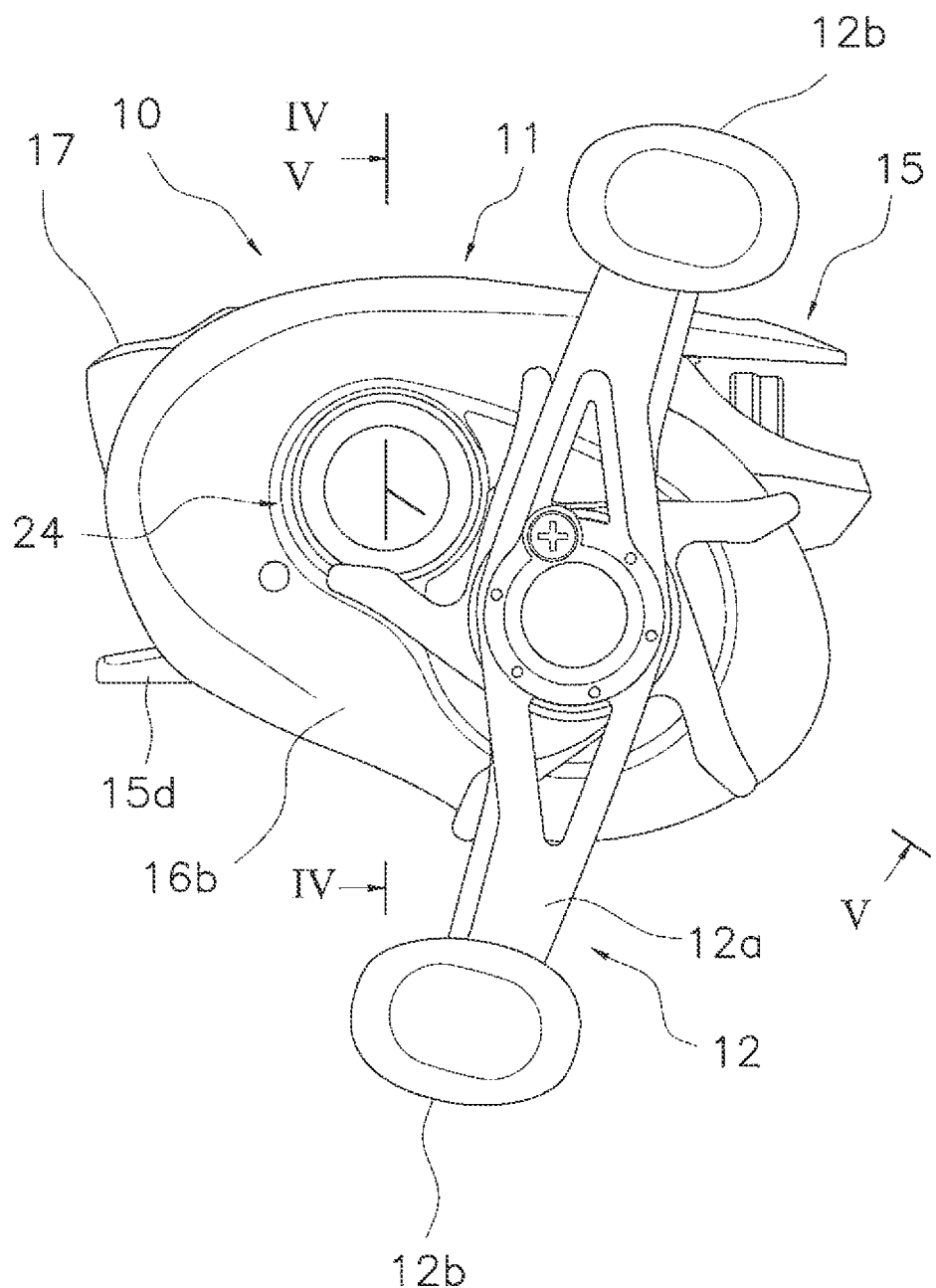
FIG. 2 is a right side view of the dual-bearing reel illustrated in FIG. 1.
Figure 3:
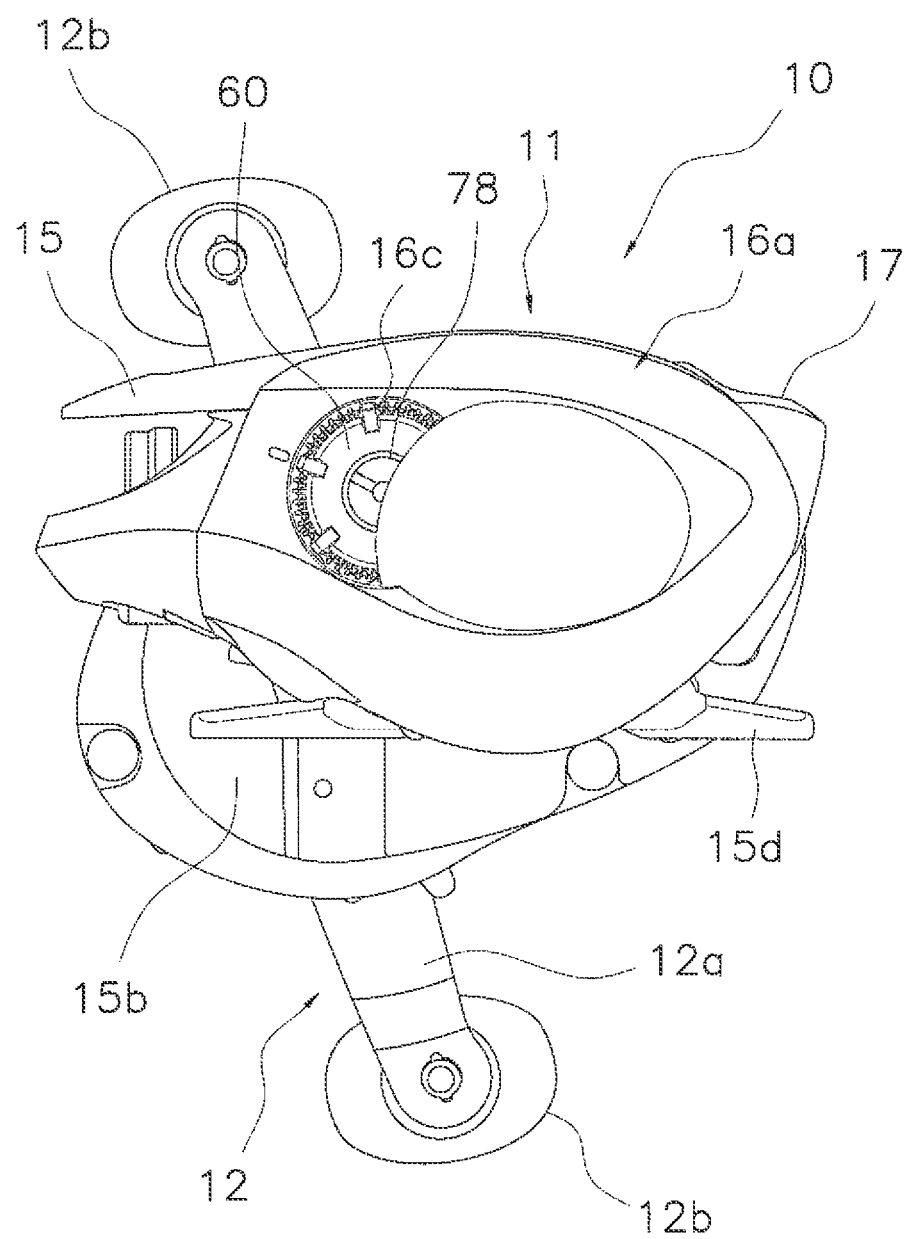
FIG. 3 is a left side view of the dual-bearing reel illustrated in FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The dual-bearing reel 10 according to one embodiment of the present invention, as shown in FIGS. 1 to 5, is a dual-bearing reel for bait casting. This reel comprises a reel body 11, a spool rotary drive handle 12, a star drag 13, a spool 14 and a spool shaft 20. The spool rotary drive handle 12 is disposed one side of the reel body 11. The star drag 13 is disposed on the side of the reel body 11 with the handle 12 for adjusting the drag. The spool 14 is rotatably mounted to the reel body 11 for winding line. The spool shaft 20 rotatably mounts the spool 14 to the reel body 11 for winding line.

Figure 5:
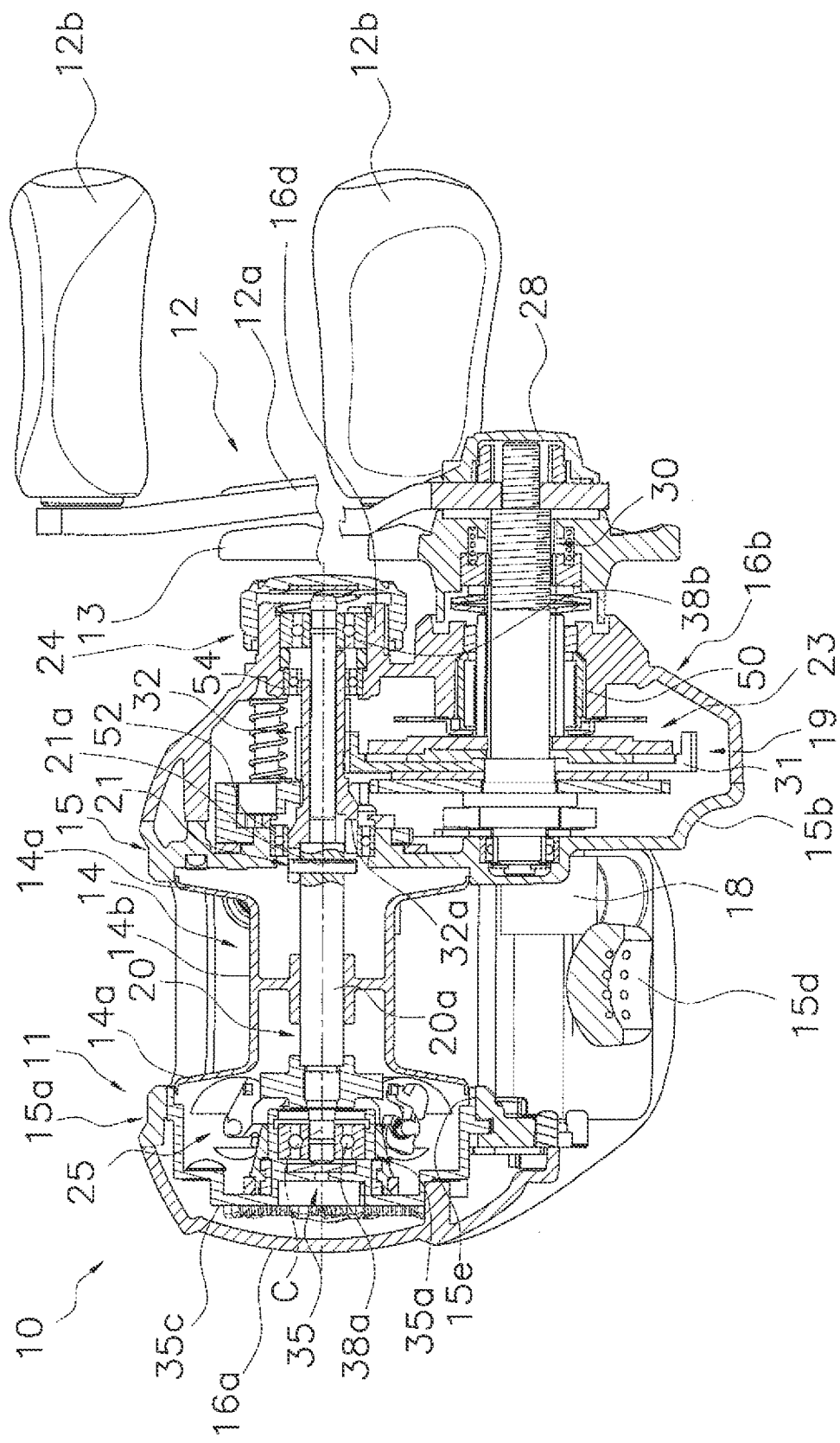
FIG. 5 is a cross-sectional diagram of the dual-bearing reel as seen along section line V-V in FIG. 2.

The handle 12 is a type of double handle. The handle 12 includes an arm portion 12a and a pair of grips 12b. The grips 12b are rotatably mounted on both ends of the arm portion 12a. The arm portion 12a, as shown in FIG. 5, is non-rotatably mounted on the tip of the drive shaft 30. The arm portion 12a is fastened to the drive shaft 30 with a nut 28. The handle 12 is disposed on the second side cover 16b mentioned below.

Figure 4:
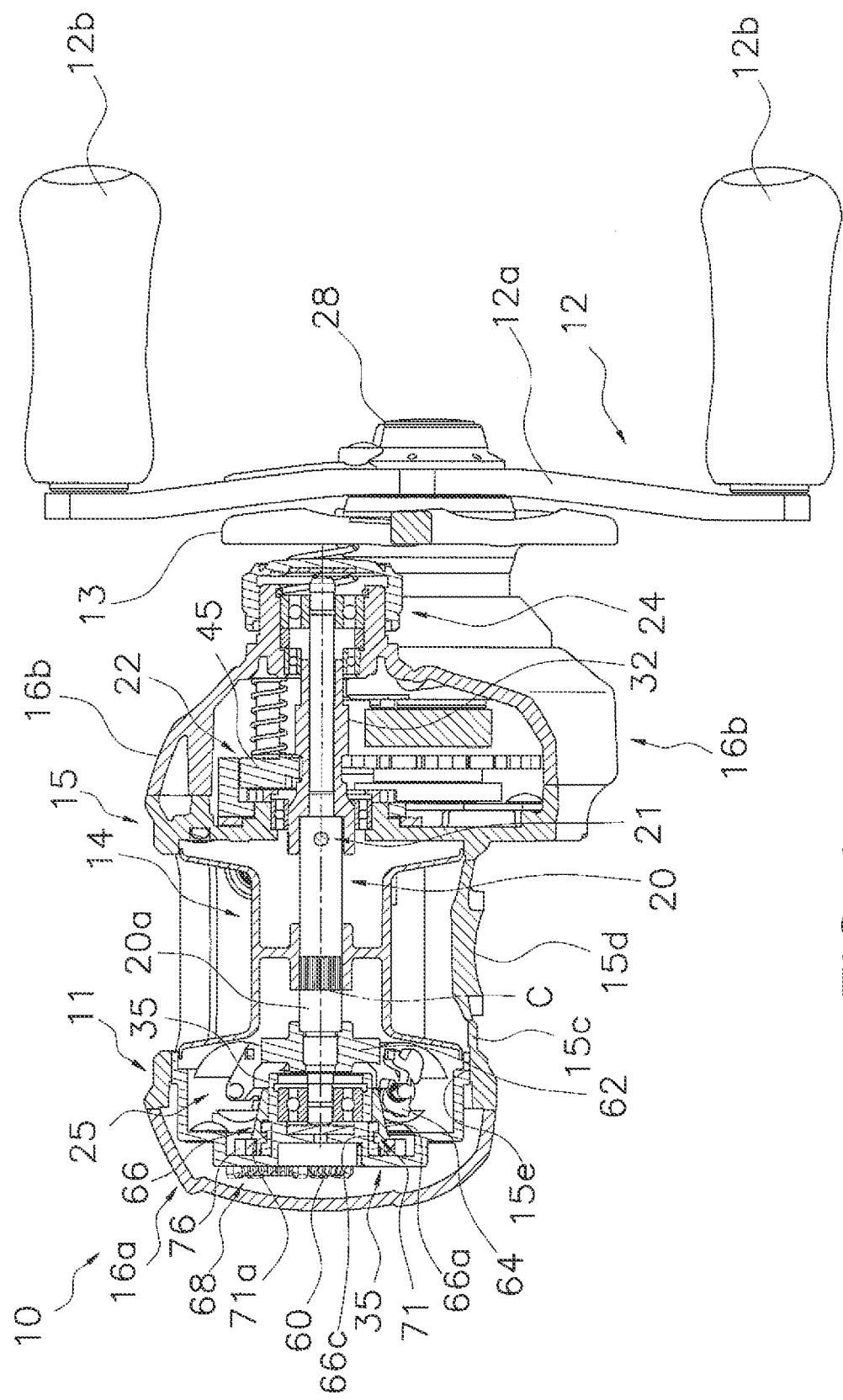
FIG. 4 is a cross-sectional diagram of the dual-bearing reel as seen along section line IV-IV in FIG. 2.

As shown in FIGS. 4 and 5, the reel body 11 is, for example, a light metallic member such as a magnesium alloy. The reel body 11 comprises a frame 15, a first side cover 16a, a second side cover 16b and a shaft support portion 35. The first and second side covers 16a and 16b are mounted on both sides of the frame 15. The spool 14 is rotatably mounted via a spool shaft 20 inside of the reel body 11. As shown in FIG. 5, the first side cover 16a is detachably mounted to a first side plate 15a, and covers the outside of the first side plate 15a. The second side cover 16b is screwed to the second side plate 15b, and covers the outside of the second side plate 15b.

As shown in FIGS. 1 to 5, a spool 14, a clutch operating member 17 is disposed in the frame 15. The clutch operating member 17 is where the thumb is placed. A level winding mechanism 18 is disposed in the frame 15 for evenly winding the fishing line onto the spool 14.

Additionally, as shown in FIGS. 4 and 5, a gear mechanism 19, a clutch mechanism 21, a clutch control mechanism 22, a drag mechanism 23 and a casting control mechanism 24 are disposed between the frame 15 and the second side cover 16b. The gear mechanism 19 is installed to transmit the torque from the handle 12 to the spool 14 and the level winding mechanism 18. The clutch mechanism 21 is installed to couple and to decouple the spool 14 and the handle 12. The clutch control mechanism 22 is installed to control the clutch mechanism 21 according to the operation of the clutch operating mechanism 17. The drag mechanism 23 is installed to control the rotation in the line delivering direction of the spool 14. The casting control mechanism 24 is installed to adjust the resistive force during the rotation of the spool 14. Additionally, a centrifugal spool braking device 25 is disposed between the frame 15 and the first side cover 16a. The centrifugal spool braking device 25 uses centrifugal force for suppressing backlash during casting.

As shown in FIGS. 4 and 5, the frame 15 comprises a first side plate 15a, a second side plate 15b and a plurality of coupling sections 15c. The second side plate 15b is disposed to mutually face the first side plate 15a with a predefined space in between them. The coupling sections 15c (for example, 3) integrally couple the first side plate 15a and the second side plate 15b in the front and back as well as the lower part. A fishing rod mounting portion 15d is integrally formed in the coupling portion 15c in the lower side for mounting the fishing rod. The first side plate 15a comprises an opening portion 15e that is circularly formed with a shaft core C of the spool shaft 20 as the center in the center part. A shaft support portion 35 is detachably coupled with the opening portion 15e.

Figure 6:
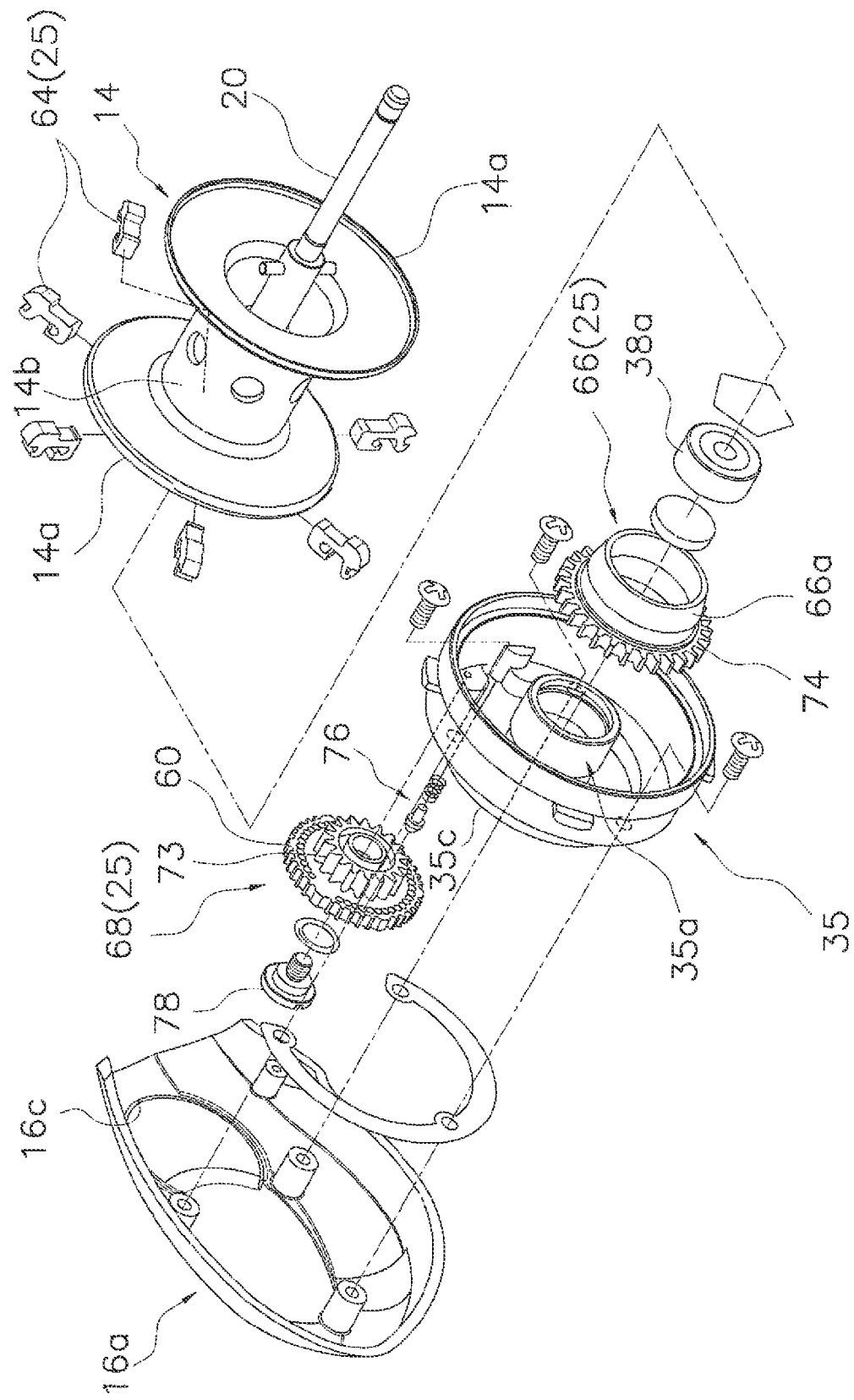
FIG. 6 is an exploded perspective view of the spool braking device.

As shown in FIGS. 4 to 6, the spool 14 is installed between the first side plate 15a and the second side plate 15b. The spool 14 is rotatably supported by the reel body 11. The spool 14 comprises a pair of plate-like flange portions 14a and a tube-like bobbin trunk 14b. The plate-like flange portions 14a are on located as side parts. The tube-like bobbin trunk 14b is located between the two flange portions 14a. The spool 14 is integrally and rotatably fixed to the spool shaft 20 that extends through the inner peripheral side of the bobbin trunk 14b. For example, the spool 14 is integrally and rotatably fixed to the spool shaft 20 by serration bonding.

The spool shaft 20 is, for example, a non-magnetic metal such as SUS304. etc. As shown in FIG. 5, the spool shaft 20 extends outwards from the second side cover 16b while extending through the second side plate 15b. One end (the left end in FIG. 5) of the spool shaft 20 is rotatably supported by an axle bearing housing portion 35a via an axle bearing 38a. The other end (the right end in FIG. 5) of the spool shaft 20 that extends outwards from the second side cover 16b is rotatably supported by a boss portion 16d that is formed on the second side cover 16b by an axle bearing 38b. A large-diameter portion 20a is formed in the center part in the axial direction of the spool shaft 20. In the part where the large-diameter portion 20a extends through the second side plate 15b is installed a clutch pin 21a that forms the clutch mechanism 21 that extends along the radial direction. Both ends of the clutch pin 21a protrude from the outer peripheral surface of the spool shaft 20.

The clutch operating member 17, as shown in FIG. 1, is disposed rearwards from the spool 14 in the rear part between the first side plate 15a and the second side plate 15b. The clutch operating member 17 is coupled to the clutch control mechanism 22. The clutch operating member 17 is slidable in the up/down direction between the first side plate 15a and the second side plate 15b. With the sliding of the clutch operating member 17, the clutch mechanism 21 is switched between the coupled state and the uncoupled state. The clutch operating member 17 is guided in the up/down direction that approach and separate from the fishing rod mounting portion 15d by a guide axle (not diagrammed) installed in the first side plate 15a on the side with the spool 14.

The gear mechanism 19, as shown in FIG. 5, comprises a drive shaft 30, a drive gear 31 that is fixed to the drive shaft 30, and a tube-like pinion gear 32 that engages with the drive gear 31. The drive shaft 30 is rotatably mounted to the second side plate 15b and the second side cover 16b. The rotation (reverse) of the drive shaft 30 in the line delivering direction is prohibited by a roller-type one-way clutch 50. The roller-type one-way clutch 50 is mounted between the second side cover 16b and the drive shaft 30. The drive gear 31 is rotatably mounted to the drive shaft 30, and is coupled to the drive shaft 30 via the drag mechanism 23.

The pinion gear 32 extends in the direction of the spool shaft 20 while extending through the second side plate 15b. The pinion gear 32 is a tube-like member, the center through which extends through the spool shaft 20. The pinion gear 32 is mounted to the second side plate 15b and the second side cover 16b by an axle bearing 52 and an axle bearing 54 rotatably as well as movably in the axial direction. An engaging groove 32a is formed at one end (the left end in FIG. 5) of the pinion gear 32. The engaging groove 32a engages with the clutch pin 21a. This pinion gear 32 and the clutch pin 21a form the clutch mechanism 21. The pinion gear 32 moves to the clutch "on" position shown on the upper side of the shaft core C and to the clutch "off" position shown on the lower side of the shaft core C of the spool shaft 20 in FIG. 5 with the clutch control mechanism 22.

As shown in FIG. 4, the clutch control mechanism 22 includes a clutch yoke 45 that moves the pinion gear 32 along the axial direction of the spool shaft 20. When the clutch operating member 17 is moved to the clutch "off" position, the clutch yoke 45 moves the pinion gear to the clutch "off" position. Additionally, the clutch control mechanism 22 comprises a clutch return mechanism, which is not diagrammed, that puts the clutch mechanism 21 in the clutch "on" position in conjunction with the rotation in the line winding direction of the spool 14.

The spool braking device 25 functions to apply a braking force to the spool 14 using centrifugal force. The spool braking device 25 is mounted to the spool shaft 20 and the shaft support portion 35. As shown in FIGS. 4 to 7, the spool braking device 25 comprises a brake drum 66, a rotating member 62, a plurality of brake shoes 64 (for example, six brake shoes) and a moving mechanism 68.

The brake drum 66 is disposed inward in the radial direction of the brake shoes 64. The brake drum 66 contacts the brake shoes 64 while the brake shoes 64 are pivoted to a braking position. Specifically, at least a part of the brake drum 66 is disposed inwards in the radial direction with respect to the brake shoes 64. More specifically, the brake drum 66 comprises a tapered outer peripheral surface 66a (henceforth, referred to as the tapered surface) that tilts toward the spool 14. The tapered surface 66a is formed inward in the radial direction of the brake shoes 64. This tapered surface 66a contacts the pivoting brake shoe 64 while the brake shoes 64 are pivoted to a braking position.

The rotating member 62 is, for example, a nearly circular member made from synthetic resin such as polyacetal resin, etc. The rotating member 62 rotates in the line delivering direction of the spool 14 in conjunction with, for example, the rotation of the spool 14. The rotating member 62 is integrally and rotatably coupled with the spool shaft 20 by an appropriate fixing means, such as press fitting.

Figure 7:
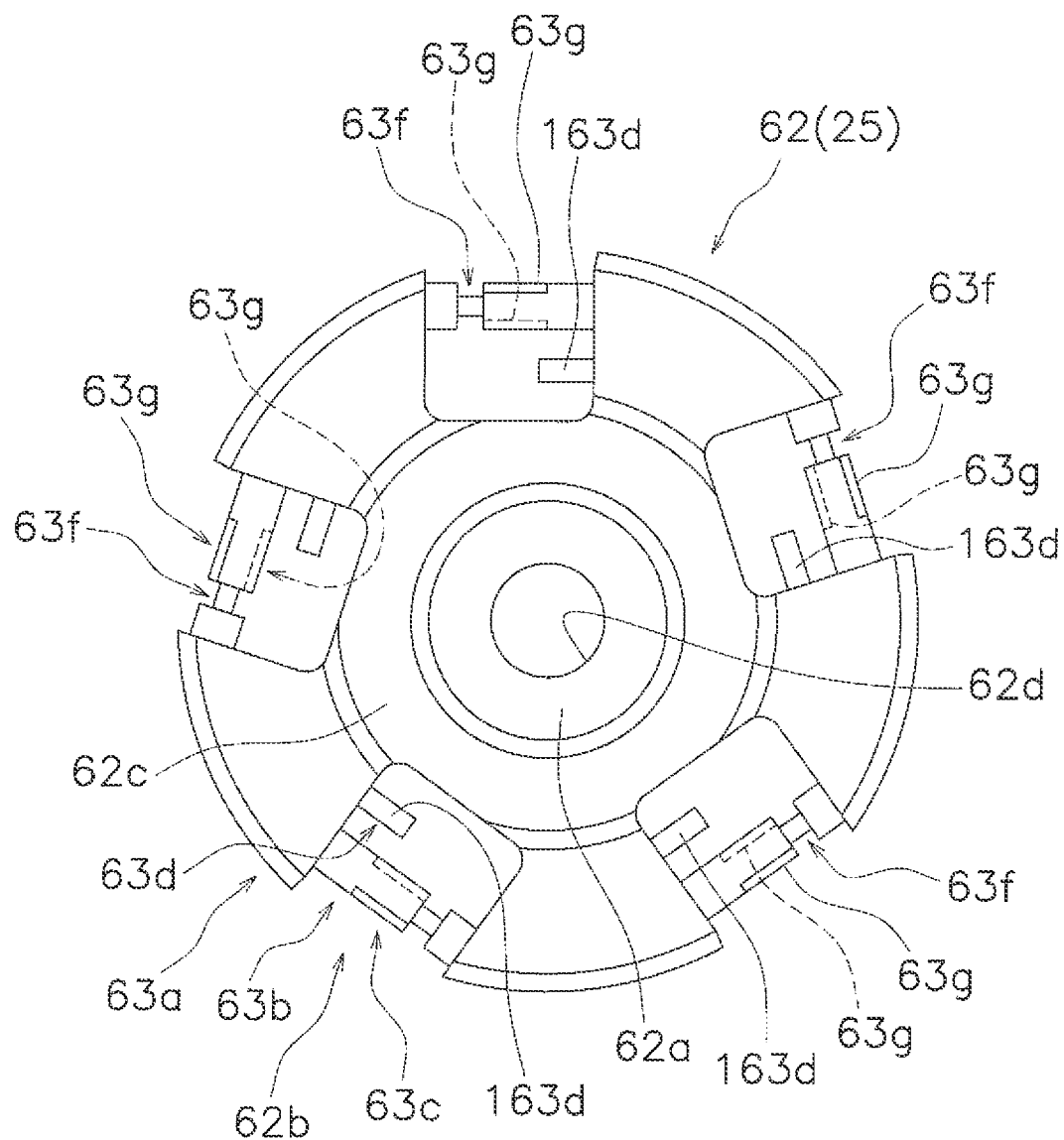
FIG. 7 is a side view of a rotating member.

As shown in FIGS. 4 and 7, the rotating member 62 comprises a boss portion 62a, a thick-walled annular shoe attaching portion 62b and a connecting portion 62c. The boss portion 62a has an inner peripheral part that is fixed to the spool shaft 20. The thick-walled annular shoe attaching portion 62b is disposed outward in the radial direction of the boss portion 62a. The connecting portion 62c connects the boss portion 62a and the shoe attaching portion 62b. The boss portion 62a is a tube-like section that comprises a through-hole 62d with steps and that is penetrated by the spool shaft 20. The through-hole 62d is positioned by the spool shaft 20.

As shown in FIG. 7, the shoe attaching portion 62b comprises a main body section 63a, a plurality of shoe supporting recesses 63b, a plurality of pivot shaft portions 63c and a plurality of fixing portions 63d. For example, six of the shoe supporting recesses 63b are installed in the main body section 63a. For example, six of the pivot shaft portions 63c are installed in the shoe supporting recesses 63b. For example, six of the fixing portions 63d are disposed on the shoe supporting recesses 63b with a space between them and the pivot shaft portions 63c. The shoe supporting recesses 63b are installed with spaces between them in the circumferential direction. In this embodiment, the shoe supporting recesses 63b are disposed at equal intervals in the rotating direction of the spool 14. The shoe supporting recesses 63b are formed concavely at a width so that brake shoes 64 can be disposed and can be moved axially along the pivot shaft portion 63c.

Figure 8:
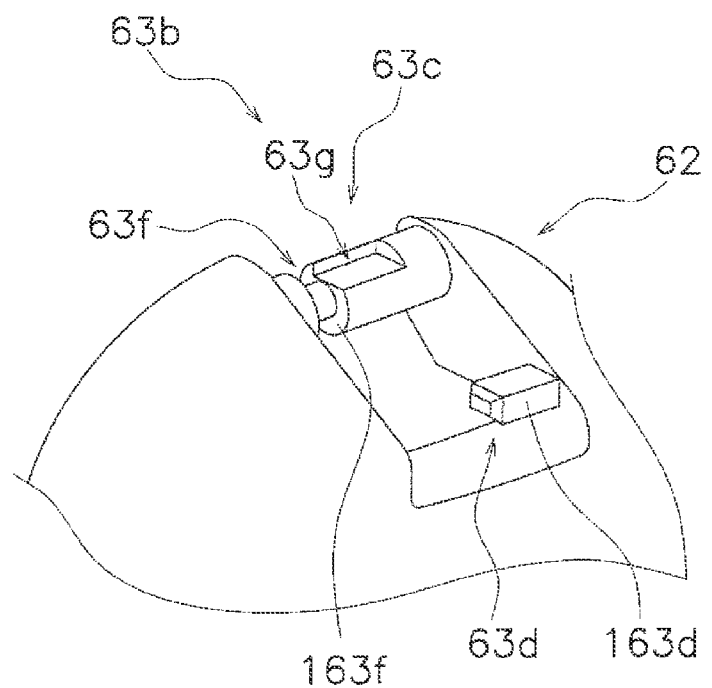
FIG. 8 is an enlarged oblique view of a shoe support recess.

As shown in FIGS. 7 and 8, the pivot shaft portion 63c pivotally supports the brake shoe 64 and movably supports the brake shoe 64 in the pivot shaft direction. The pivot shaft portion 63c extends in a direction that crisscrosses with the spool shaft 20 and that is integrally formed on the shoe supporting recess 63b. The pivot shaft portion 63c is formed in a near circular shape.

The pivot shaft portion 63c comprises a groove section 63f for pivoting (one example of a first guide part for pivoting) that guides the pivoting of the brake shoe 64 and a notched section 63g for moving (one example of a second guide part for axial moving) that guides the movement of the brake shoe 64 in the pivot shaft direction. The groove section 63f is formed in the circumferential direction on the outer peripheral surface on one end side of the pivot shaft portion 63c for pivoting. The groove section 63f is formed in a position with a predefined space between the groove section and a wall section of the shoe supporting recess 63b for pivoting.

As shown in FIGS. 7 to 11, the notched section 63g is formed on the outer peripheral surface of the pivot shaft portion 63c so as to extend in the axial direction of the pivot shaft portion 63c for moving. Specifically, the outer peripheral surface of the pivot shaft portion 63c has a plurality of notched sections 63g for moving (for example, two) are formed on. The notched section 63g functions to guide the protrusion 64d for the pivoting (mentioned below) of the brake shoe 64. One end side of the notched section 63g for moving forms a notch in a wall section 163f (refer to FIG. 8) of the groove section 63f for pivoting. More specifically, one end side of the notched section 63g for moving forms a notch in a wall section 163f of the groove section 63f for pivoting on the side that is far from the wall section of the shoe supporting recess 63b.

Figure 11:
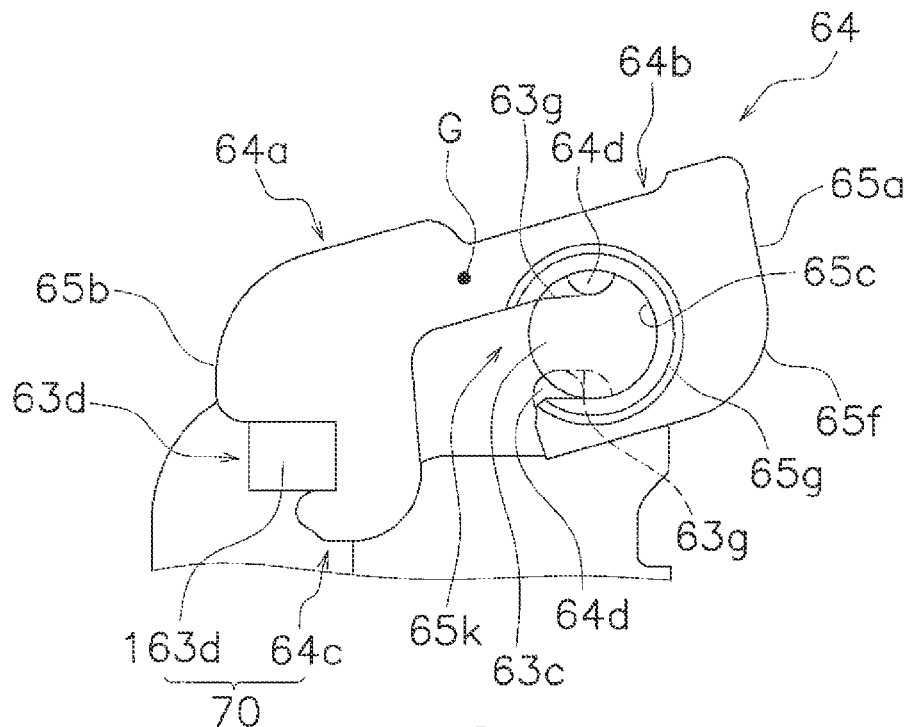
FIG. 11 is a side view showing the pivot shaft portion and the brake shoe in the non-pivoting position.

As shown in FIGS. 8 and 11, the fixing portion 63*d* engages with the brake shoe 64 and non-pivotally retains the brake shoe 64. Specifically, the fixing portion 63*d* comprises a shoe retaining section 163*d* (one example of a protrusion). The shoe retaining section 163*d* extends along a direction that crisscrosses with the spool shaft 20 and is integrally formed on the shoe supporting recess 63*b*. Specifically, the shoe retaining section 163*d* extends essentially parallel with the pivot shaft portion 63*c* and is integrally formed on the shoe supporting recess 63*b*. The cross section of the shoe retaining section 163*d* is formed in a near rectangle.

The shoe retaining section 163*d* forms an on/off switching mechanism 70 (refer to FIG. 11). The on/off switching mechanism 70 is a mechanism to switch the brake shoe 64 between the operable state (the state in FIG. 10) and the inoperable state (the state in FIG. 11). The operable state is a state in which the brake shoe 64 is in contact with the brake drum 66. The inoperable state is a state in which the brake shoe 64 is not in contact with the brake drum 66. By switching the brake shoe 64 between the operable state and the inoperable state, the number of brake shoes 64 that are in contact with the brake drum 66 can be freely set.

As shown in FIG. 7, the connecting portion 62*c* is a thick-walled, disc-like member, and is integrally formed on the outer peripheral part of the boss portion 62*a*. A main body section 63*a* of the shoe attaching portion 62*b* is integrally formed on the end surface on the outer peripheral side of the connecting portion 62*c*.

The brake shoe 64 is a synthetic resin member having elasticity, such as, for example, polyamide. As shown in FIGS. 8 to 11, the brake shoe 64 is pivotally mounted to the rotating member 62 around an axis that crisscrosses with the spool shaft 20. Specifically, the brake shoe 64 is pivotally mounted to the pivot shaft portion 63*c* around the pivot shaft portion 63*c* of the rotating member 62. Additionally, the brake shoe 64 is movably mounted to the rotating member 62 around the axis of the pivot shaft portion 63*c*.

Specifically, the brake shoe 64 is movable axially along the pivot shaft portion 63*c* between the pivoting position (the position in FIG. 10) that permits the pivoting of the brake shoe 64 and the non-pivoting position (the position in FIG. 11) in which the brake shoe 64 engages with the shoe retaining section 163*d*. The pivoting position is a position in which the brake shoe 64 pivots in the left end part of the pivot shaft portion 63*c* shown in FIG. 8. The non-pivoting position is a position in which the brake shoe 64 has moved to the right end part of the pivot shaft portion 63*c* shown in FIG. 8. Meanwhile, the brake shoe 64 is detachable with respect to the pivot shaft portion 63*c*.

Each of the brake shoe 64 comprises a main body section 64*a*, a mounting section 64*b* that is mounted to the pivot shaft portion 63*c*, and an engaging recess 64*c* (one example of a recess) that engages with the shoe retaining section 163*d*.

The main body section 64*a* comprises a first end 65*a* and a second end 65*b* on the opposite side of the first end 65*a*. The main body section 64*a* is a member that is long in a direction from the first end 65*a* to the second end 65*b*. A contacting section 65*f* is formed on the first end 65*a*. The contacting section 65*f* comes into contact with the brake drum 66. The contacting section 65*f* is formed in a circular arc shape.

Figure 9:
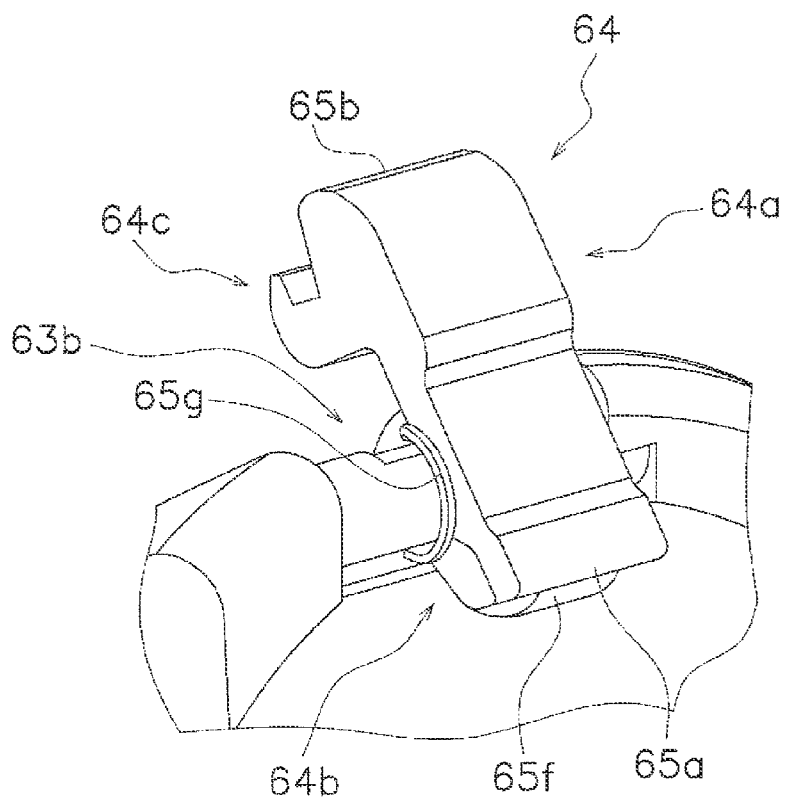
FIG. 9 is an enlarged oblique view of the brake shoe mounted to the shoe support recess.
Figure 10:
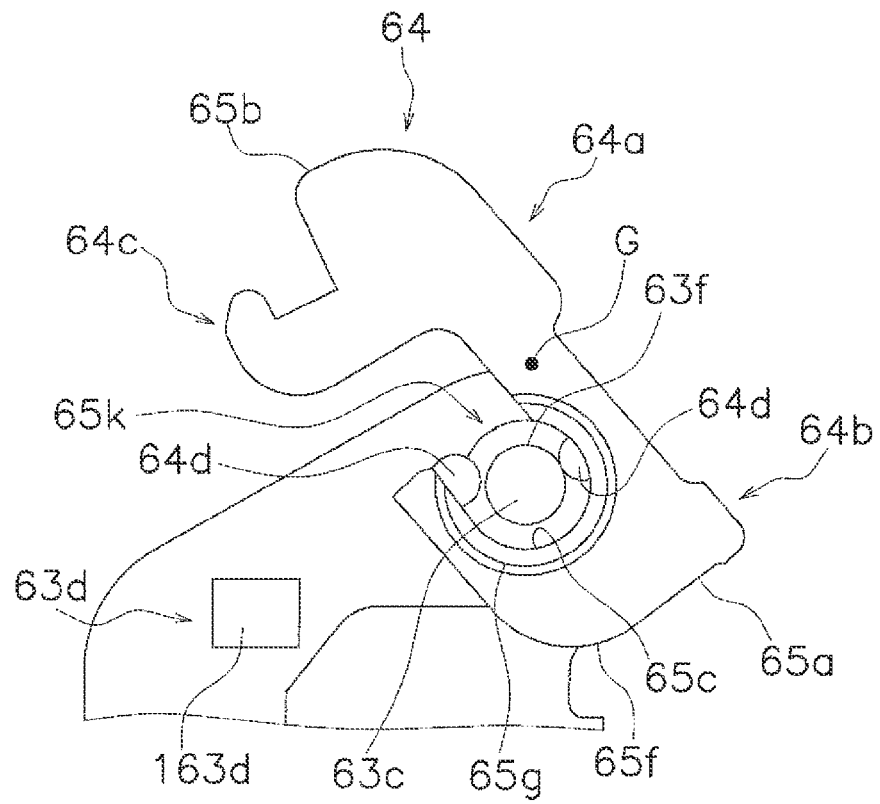
FIG. 10 is a side view showing the pivot shaft portion and the brake shoe in the pivoting position.

Additionally, the main body section 64*a* comprises a pair of boss portions 65*g* (an example of at least a part of the brake shoe). The boss portion 65*g* is integrally formed on the main body section 64*a* so as to protrude outwards from the main body section 64*a*. More specifically, the boss portion 65*g* is formed protruding outwards from the main body section 64*a* so as to surround a mounting recess 65*c* mentioned below. In FIGS. 9 to 11, only one of the pair of boss portions 65*g* is shown.

When the brake shoe 64 is located in the pivoting position, the boss portion 65*g* abuts the wall section of the shoe supporting recess 63*b* of the rotating member 62. For this reason, when the brake shoe 64 is in a pivoting state around the pivot shaft portion 63*c* in the pivoting position, that is, in a state in which the rotating member 62 is rotating, the boss portion 65*g* is pressed by the wall section of the shoe supporting recess 63*b* of the rotating member 62.

As shown in FIGS. 10 and 11, the mounting section 64*b* is a part where the brake shoe 64 is mounted to the pivot shaft portion 63*c*. The mounting section 64*b* is installed on the main body section 64*a* between the first end 65*a* and the center of gravity G. The mounting section 64*b* comprises a C-shaped mounting recess 65*c*. The mounting recess 65*c* is fitted to the pivot shaft portion 63*c*. For example, the mounting recess 65*c* is fitted to the pivot shaft portion 63*c* by a clearance fitting. The opening section 65*k* of the mounting recess 65*c* is formed with a width that is narrower than the pivot shaft portion 63*c*.

The mounting recess 65*c* comprises a protrusion 64*d* for pivoting (one example of an engaging section for pivoting). As shown in FIG. 10, the protrusion 64*d* for pivoting engages with the groove section 63*f* for the pivoting of the pivot shaft portion 63*c* and is guided along the groove section 63*f* for pivoting in the pivoting position. When the protrusion 64*d* for pivoting is guided along the groove section 63*f* for pivoting, the brake shoe 64 pivots around the pivot shaft portion 63*c*.

Additionally, as shown in FIG. 11, when the brake shoe 64 is disposed in a predefined pivoting angle, the protrusion 64*d* for pivoting can be engaged with the notched section 63*g* for moving the pivot shaft portion 63*c*. In this state, if the brake shoe 64 is moved in a direction along the pivot shaft portion 63*c*, the protrusion 64*d* for pivoting moves along the notched section 63*g* for moving the pivot shaft portion 63*c*. With this, the brake shoe 64 moves from the pivoting position to the non-pivoting position. Additionally, with this, in a state in which the brake shoe 64 is in a position that is a non-pivoting position, if the brake shoe 64 is moved in a direction along the pivot shaft portion 63*c*, the protrusion 64*d* for pivoting moves along the notched section 63*g* for moving the pivot shaft portion 63*c*. As a result, the brake shoe 64 moves from the non-pivoting position to the pivoting position.

The engaging recess 64*c* is a part that engages with the shoe retaining section 163*d*. The engaging recess 64*c* forms the on/off switching mechanism 70 (refer to FIG. 11). The engaging recess 64 is formed in a rectangular shape so as to surround the shoe retaining section 163*d* in three directions. The engaging recess 64*c* forms the on/off switching mechanism 70. The engaging recess 64*c* is fitted to the shoe retaining section 163*d*. More specifically, the engaging recess 64*c* is fitted to the shoe retaining section 163*d* when the brake shoe 64 is moved from the pivoting position to the non-pivoting position. With this, the brake shoe 64 is maintained to be non-pivotal with respect to the rotating member 62 in the non-pivoting position.

In this way, the number of brake shoes 64 that are in contact with the brake drum 66, in other words, the number of brake shoes 64 that can be contact with the brake drum 66, can be freely set by the on/off switching mechanism 70 (the shoe retaining section 163*d* and the engaging recess 64*c*). In other words, the brakes can be applied to the rotation in the line delivering direction of the spool 14 in a wide range with the on/off switching mechanism 70.

A brake shoe 64 that comprises a configuration such as the above will pivot with the pivoting shaft core P as the center due to the centrifugal force that is applied to the center of gravity G when the spool 14 rotates.

The moving mechanism 68 can relatively move and position the brake shoe 64 and the brake drum 66 in the axial direction of the spool shaft 20. The moving mechanism 68, as shown in FIGS. 3 to 6, comprises an operating member 60, a brake cam 71 (refer to FIG. 4), a first gear member 73 (refer to FIG. 6), and a second gear member 74 that engages with the first gear member 73.

The operating member 60 is, for example, a circular synthetic resin knob and is exposed outside of the first side cover 16a by the opening section 16c that is formed on the first side cover 16a. The operating member 60 is rotatably supported by a screw shaft 78 that is screwed to the outer peripheral surface of a bottom section 35c of the shaft support portion 35. The operating member 60 is positioned plurally (for example, around 40 steps) by a positioning mechanism 76. The first gear member 73 is integrally formed with the operating member 60. The second gear member 74 is integrally and rotatably coupled with the brake drum 66.

As shown in FIG. 4, the brake drum 66 engages with the shaft support portion 35 via a brake cam 71. The brake cam 71 is non-rotatably fixed to the outer peripheral surface of the shaft support portion 35. The brake cam 71 comprises a spiral cam groove 71a. The brake cam 71 (cam groove 71a) engages with, for example, a plurality of cam protrusions 66c that are formed protruding from the inner peripheral surface of the brake drum 66. With this, when the operating member 60 is rotated in one direction, the brake drum 66 moves in a direction that approaches the spool 14, and the braking force gradually becomes stronger. Additionally, if the operating member is rotated in the other direction, the brake drum 66 moves in a direction separate from the spool 14, and the braking force gradually becomes weaker.

With the spool braking device 25, when the operating member 60 is in the operation start position, the contacting section 65f of the brake shoe 64 comes into contact with the small-diameter side of the tapered surface 66a of the brake drum 66. At this time, the pivoting angle of the brake shoe 64 becomes the largest, and the pressing force with which the brake drum 66 presses the brake shoe 64 becomes the smallest. With this, the braking force that is applied to the spool 14 is the smallest.

When the operating member 60 is rotated from the operation start position, the first gear member 73 rotates. Then, the second gear member 74 that engages with the first gear member 73 will rotate, and the brake drum 66 will also rotate. Then, the brake drum 66 moves in a direction that approaches the spool 14 via the brake cam 71. At this time, the contacting section 65f of the brake shoe 64 moves to the large-diameter side of the tapered surface 66a. Then, the pivoting angle of the brake shoe 64 will become gradually smaller, and the pressing force with which this brake drum 66 presses the brake shoe 64 will gradually become larger. Consequently, the braking force that is applied to the spool 14 becomes gradually larger.

When the operating member 60 is set to the maximum braking position, the pivoting angle of the brake shoe 64 becomes the smallest, and the pressing force with which the brake drum 66 presses the brake shoe 64 becomes the maximum. Consequently, the braking force that is applied to the spool 14 becomes the largest. In this case, the contacting section 65f of the brake shoe 64 can be in contact with the large-diameter side of the tapered surface 66a of the brake drum 66 or with a tube-like section that is integrally formed connected to a proximal end section (the large-diameter side) of the tapered surface 66a.

Meanwhile, when operating the operating member 60 from the maximum braking position to the operation start position, contrary to the above, the braking force gradually becomes weaker.

Each of the six brake shoes 64 can be set to either the pivoting position or the non-pivoting position. Since the settings and behavior of each brake shoe 64 are the same, here, they will be explained with a focus on one brake shoe 64.

In a state in which the brake shoe 64 is set to a pivoting position (the operable state), when the rotating member 62 rotates in conjunction with the rotation of the spool 14, the brake shoe 64 pivots due to the centrifugal force. More specifically, when the rotating member 62 rotates, the protrusion 64d for pivoting the brake shoe 64 is guided along the groove section 63f for pivoting the pivot shaft portion 63c while the brake shoe 64 pivots. Then, the brake shoe 64 comes into contact with the brake drum 66, and the brakes are applied to the rotation of the spool 14. Specifically, the contacting section 65f of the brake shoe 64 is in contact with the brake drum 66, thereby applying the brakes to the rotation of the spool 14.

Here, the brake shoe 64 is set to the pivoting position; in a state in which the rotating member 62 is stopped, if the user pivots the brake shoe 64 to a predefined pivoting angle, the protrusion 64d for pivoting the brake shoe 64 can engage with the notched section 63g for moving. In this state, when the user pushes the brake shoe 64 in the direction following the pivot shaft portion 63c, the protrusion 64d for pivoting the brake shoe 64 is guided to the notched section 63g for moving the pivot shaft portion 63c, and the brake shoe 64 is moved from the pivoting position to the non-pivoting position. Then, the engaging recess 64c of the brake shoe 64 will be fitted to the shoe retaining section 163d of the rotating member 62. With this, the brake shoe 64 will not pivot around the pivot shaft portion 63c in the non-pivoting position. This state is the inoperable state.

Additionally, in a state in which the brake shoe 64 is set to the non-pivoting position and the rotating member 62 is stopped, when the user pushes the brake shoe 64 in the direction following the pivot shaft portion 63c (in the direction opposite to the above), the fitting between the engaging recess 64c of the brake shoe 64 and the shoe retaining section 163d of the rotating member 62 will be released. Then, the protrusion 64d for pivoting the brake shoe 64 will be guided to the notched section 63g for moving the pivot shaft portion 63c. Next, when the brake shoe 64 arrives at the pivoting position, the protrusion 64d for pivoting the brake shoe 64 will detach from the notched section 63g for moving the pivot shaft portion 63c and will be disposed in the groove section 63f for pivoting the pivot shaft portion 63c. In this way, the brake shoe 64 moves from the non-pivoting position to the pivoting position.

In this way, each of the six brake shoes 64 can be freely set to either the pivoting position or the non-pivoting position. That is, the braking force that is applied to the rotation of the spool 14 can be adjusted by disposing each brake shoe 64 to the pivoting position or to the non-pivoting position.

The spool braking device 25 of the present dual-bearing reel 10 applies the brakes the spool 14, which is rotatably mounted on the reel body 11, with centrifugal force. The spool braking device 25 comprises at least one brake shoe 64 for applying brakes to the spool 14, a rotating member 62, and a brake drum 66. The rotating member 62 rotates in conjunction with the rotation of the spool 14. The rotating member 62 comprises a pivot shaft portion 63c and a fixing portion 63d.

The pivot shaft portion 63c pivotally supports the brake shoe 64 as well as movably supports the brake shoe 64 in the pivot shaft direction. The fixing portion 63d engages with the brake shoe 64 and non-pivotally fixes the brake shoe 64. The tapered surface 66a of the brake drum 66 is disposed inwards in the radial direction or outwards in the radial direction with respect to the brake shoe 64. The tapered surface 66a of the brake drum 66 is in contact with the pivoting brake shoe 64.

In the present spool braking device 25, by moving the brake shoe 64 in a pivot shaft direction that is different from the direction in which the centrifugal force acts, the device can be engaged with the fixing portion 62 of the rotating member 63d. With this, the brake shoe 64 can be non-pivotally fixed. Meanwhile, the brake shoe 64 can be swung by releasing the engagement of the brake shoe 64 and the fixing portion 63d of the rotating member 62. In this way, by moving the brake shoe 64 in a pivot shaft direction that is different from the direction in which the centrifugal force acts, the brake shoe 64 can be easily switched between the operable state and the inoperable state. Additionally, since the brake shoe 64 can be easily switched between the operable state and the inoperable state by moving in a pivot shaft direction that is different from the direction in which the centrifugal force acts, the brake shoe can be stably operated in the operable state; even if a greater-than-expected amount of centrifugal force is applied to the spool in the inoperable state, device can be reliably fixed.

In the present dual-bearing reel 10 spool braking device 25, the brake shoe 64 is movable along the pivot shaft portion 63c between the pivoting position, in which the pivoting the brake shoe 64 is permitted, and the non-pivoting position, in which the brake shoe 64 engages with the fixing portion 63d.

In this case, by moving the brake shoe 64 along the pivot shaft portion 63c, the brake shoe can be disposed in the pivoting position and the non-pivoting position. With this, the brake shoe 64 can be swung in the pivoting position, and the brake shoe 64 can be non-pivotally fixed in the non-pivoting position. In other words, by installing an operable state position of the brake shoe 64 (the pivoting position) and an inoperable state position of the brake shoe 64 (the non-pivoting position), the brake shoe 64 can be stably operated in the pivoting position and can be reliably fixed in the non-pivoting position.

In the present dual-bearing reel 10 spool braking device 25, the brake shoe 64 comprises a groove section 63f for pivoting that guides the pivot of the brake shoe 64. The rotating member 62 comprises a protrusion 64d for pivoting that engages with and is guided by the groove section 63f for pivoting.

In this case, since the protrusion 64d for pivoting engages with and is guided by the groove section 63f for pivoting, the brake shoe 64 can be stably swung. In other words, the brake shoe 64 can be stably operated in the operable state.

In the present dual-bearing reel 10 spool braking device 25, the rotating member 62 (the pivot shaft portion 63c) comprises a notched section 63g for moving. The protrusion 64d for pivoting can engage with the notched section 63g for moving when the brake shoe 64 is disposed in a predefined pivoting angle.

In this case, since the protrusion 64d for pivoting engages with and is guided by the notched section 63g for moving, the brake shoe 64 can be stably moved along the pivoting shaft. In other words, the brake shoe 64 can be stably moved between the operable state and the inoperable state. With this, the brake shoe 64 can be easily switched between the operable state and the inoperable state.

Additionally, the protrusion 64d for pivoting will engage with and be guided by the notched section 63g for moving only when the brake shoe 64 is disposed in a predefined pivoting angle. For this reason, the brake shoe 64 can be regulated to not move from the pivoting position to the non-pivoting position, contrary to user intentions, when the brake shoe 64 is in the operable state. In other words, the brake shoe 64 can be stably operated in the operable state.

In the present dual-bearing reel 10 spool braking device 25, the fixing portion 63d comprises a shoe retaining section 163d that is essentially parallel with the pivot shaft portion 63c. The brake shoe 64 comprises an engaging recess 64c that engages with the shoe retaining section 163d.

In this case, by moving the brake shoe 64 along the pivot shaft portion 63c and engaging the shoe retaining section 163d with the engaging recess 64c, the brake shoe 64 is non-pivotally fixed. With this, the brake shoe 64 can be reliably fixed in the inoperable state.

In the present dual-bearing reel 10 spool braking device 25, the pivot shaft portion 63c extends in a direction that criss-crosses with the rotational axis of the rotating member 62.

In this case, the pivot shaft portion 63c is installed on the rotating member 62 so as to extend in a direction that criss-crosses with the rotational axis of the rotating member 62. In this way, even if the pivot shaft portion 63c is installed on the rotating member 62, the brake shoe 64 can come into contact with the brake drum 66. In other words, the brake shoe 64 can be in contact with the brake drum 66 in various forms, according to the design of the dual-bearing reel 10. Additionally, even in this case, the same effects as the above can be obtained.

In the present dual-bearing reel 10 spool braking device 25, the pivot shaft portion 63c extends in a direction that criss-crosses with the rotational axis of the rotating member 62. In the boss portion 65g, in a pivoting position that permits the pivoting of the brake shoe 64 in a state of being pressed by the rotating member 62, the brake shoe 64 comes into contact with the brake drum 66.

In this case, when the brake shoe 64 comes into contact with the brake drum 66, since the boss portion 65g is pressed by the rotating member 62, the brake shoe 64 can be regulated so as to move from the pivoting position to the non-pivoting position in the operable state of the brake shoe 64.

The present dual-bearing reel 10 comprises the above-described spool braking device 25. With this, the same effect as the above can also be obtained with the present dual-bearing reel 10.

Other Embodiments (a) In the above-described embodiment, an example was shown in which the brake shoe 64 comprises a protrusion 64d for pivoting and the rotating member 62 comprises a groove section 63f for pivoting. Instead of the above, the brake shoe 64 can comprise a groove section 63f for pivoting, and the rotating member 62 can comprise a protrusion 64d for pivoting.

(b) In the above-described embodiment, an example was shown in which the brake shoe 64 comprises an engaging recess 64c and the rotating member 62 comprises a shoe retaining section 163d. Instead of the above, the invention can also be configured so that the brake shoe 64 comprises a shoe retaining section 163d and the rotating member 62 comprises an engaging recess 64c.

(c) In the above-described embodiment, an example was shown in which the brake shoe 64 comprises an engaging recess 64c and the rotating member 62 comprises a shoe retaining section 163d. Here, the brake shoe 64 can be changed to the engaging recess 64c, and, as shown in FIG. 12, a hole 164c can be formed in the brake shoe 64.

Figure 12:
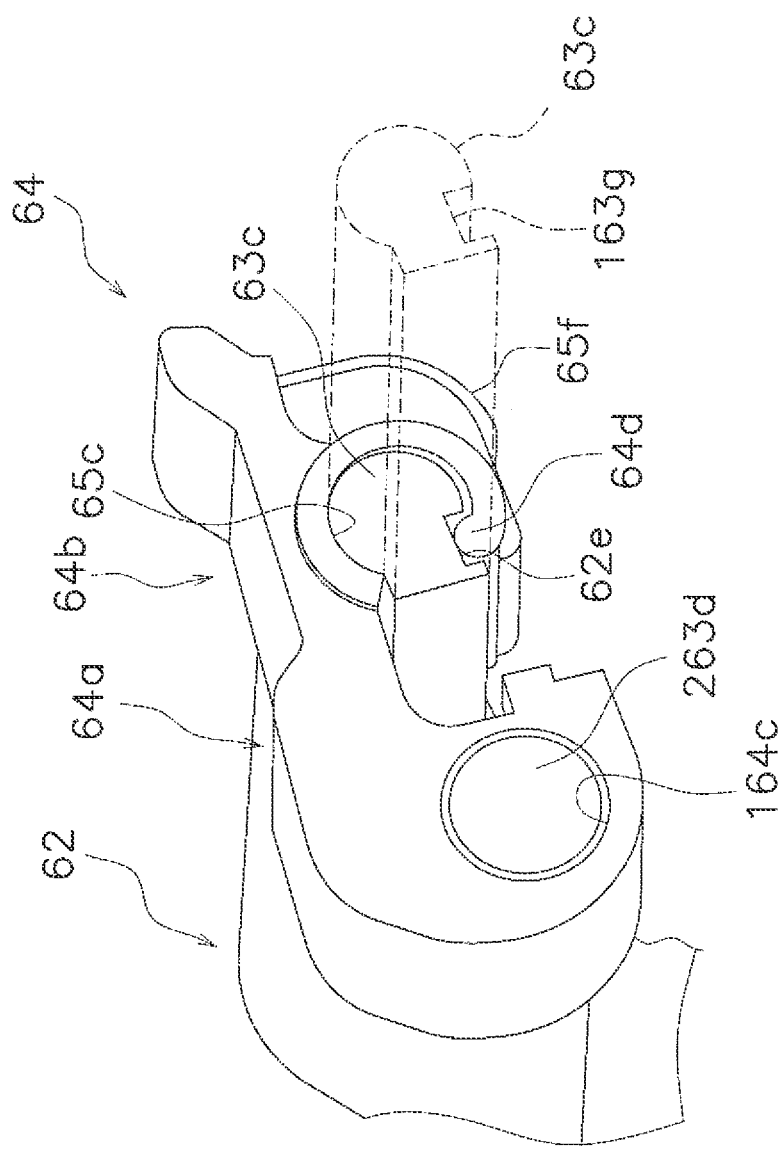
FIG. 12 is a side view showing the pivot shaft portion and the brake shoe in the non-pivoting position according to another embodiment.

Here, FIG. 12 is an example in which the spool braking device 25 does not comprise a protrusion 64d for pivoting, a groove section 63f for pivoting, or a notched section 63g for moving. Additionally, in FIG. 12, the same reference symbols are used for members and parts that are the same as in the above-described embodiment.

In this case, the brake shoe 64 comprises a hole 164c, and the rotating member 62 comprises a shoe retaining section 263d. For example, the shoe retaining section 263d is formed in a cylindrical shape. Here, by moving the brake shoe 64 along the pivot shaft portion 63c, the shoe retaining section 263d is engaged with the hole 164c. With this, the brake shoe 64 is non-pivotally fixed. In other words, the brake shoe 64 can be reliably fixed in the inoperable state.

Meanwhile, here, an example was shown in which the brake shoe 64 comprises a hole 164c and the rotating member 62 comprises a shoe retaining section 263d; however, the invention can also be configured so that the brake shoe 64 comprises a shoe retaining section 263d and the rotating member 62 comprises a hole 164c.

(d) In the above-described embodiment, an example was shown in which the brake drum is disposed inwards in the radial direction with respect to the brake shoe 64. Instead of the above, the invention can be configured so that the brake drum is disposed outwards in the radial direction with respect to the brake shoe 64. In this case, when the brake shoe 64 takes a pivoting position due to the centrifugal force, the end part of the outer peripheral side of the brake shoe 64 comes into contact with the brake drum. With this, the brakes can be applied to the spool 14.

(e) In the above-described embodiment, an example was shown in which the brake shoe 64 is non-pivotally retained by the rotating member 62 due to the engaging recess 64c or the hole 164c of the brake shoe 64 engaging with the shoe retaining sections 163d and 263d of the rotating member 62. In addition, as shown in FIG. 12, the brake shoe 64 can be fixed to the rotating member 62 by installing a positioning recess 62e (one example of a movement regulation section) on the rotating member 62.

Here, FIG. 12 is an example in which the spool braking device 25 comprises one protrusion 64d for pivoting and a groove section 163g for moving (one example of a groove section for moving) that guides this protrusion 64d for pivoting. Additionally, in FIG. 12, the same reference symbols are used for members and parts that are the same as in the above-described embodiment.

As shown in FIG. 12, the positioning recess 62e is formed on the outer peripheral surface of the end side of the pivot shaft portion 63c (the opposite side of the groove section 63f for pivoting). When the protrusion 64d for pivoting is guided to the groove section 163g for moving, and, as shown in FIG. 12, when the brake shoe 64 is positioned in the non-pivoting position, the brake shoe 64 is non-pivotally retained in the shoe retaining section 263d, and the protrusion 64d for pivoting is engaged with the positioning recess 62e. Here, the positioning recess 62e is formed so that the depth will be shallower than the groove section 163g for moving. For this reason, if the protrusion 64d for pivoting is engaged with the positioning recess 62e, the pivot shaft portion 63c is pressed against the mounting recess 65c. With this, the brake shoe 64 can be reliably retained in the non-pivoting position. Additionally, the user can confirm that the brake shoe 64 is in the inoperable state with a push feeling (a click feeling) when engaging the engaging section for the movement regulation section with the positioning recess 62e.

Here, an example was shown in which the protrusion 64d for pivoting is engaged with the positioning recess 62e in the non-pivoting position. Instead of the above, the invention can be configured so that a positioning recess or a protrusion is installed in the process of moving the brake shoe 64 from the pivoting position to the non-pivoting position along the groove section 163g for moving. In this case, the user can confirm that the brake shoe 64 is in the inoperable state with a click feeling when the protrusion 64d for pivoting goes over the positioning recess or protrusion.

(f) In the above-described embodiment, an example was shown in which a protrusion 64d for pivoting, a groove section 63f for pivoting, and a notched section 63g for moving are installed. Instead of the above, in the present spool braking device 25, the brake shoe 64 can be reliably retained in the non-pivoting position, even in the case when a protrusion 64d for pivoting, a groove section 63f for pivoting, and a notched section 63g for moving are not installed.

(g) In the above-described embodiment, an example was shown in which the pivot shaft portion 63c extends in a direction that crisscrosses with the rotational axis of the rotating member 62. Instead of the above, as shown below, the pivot shaft portion 163c can extend in a direction along the rotational axis of the rotating member 162.

Figure 13:
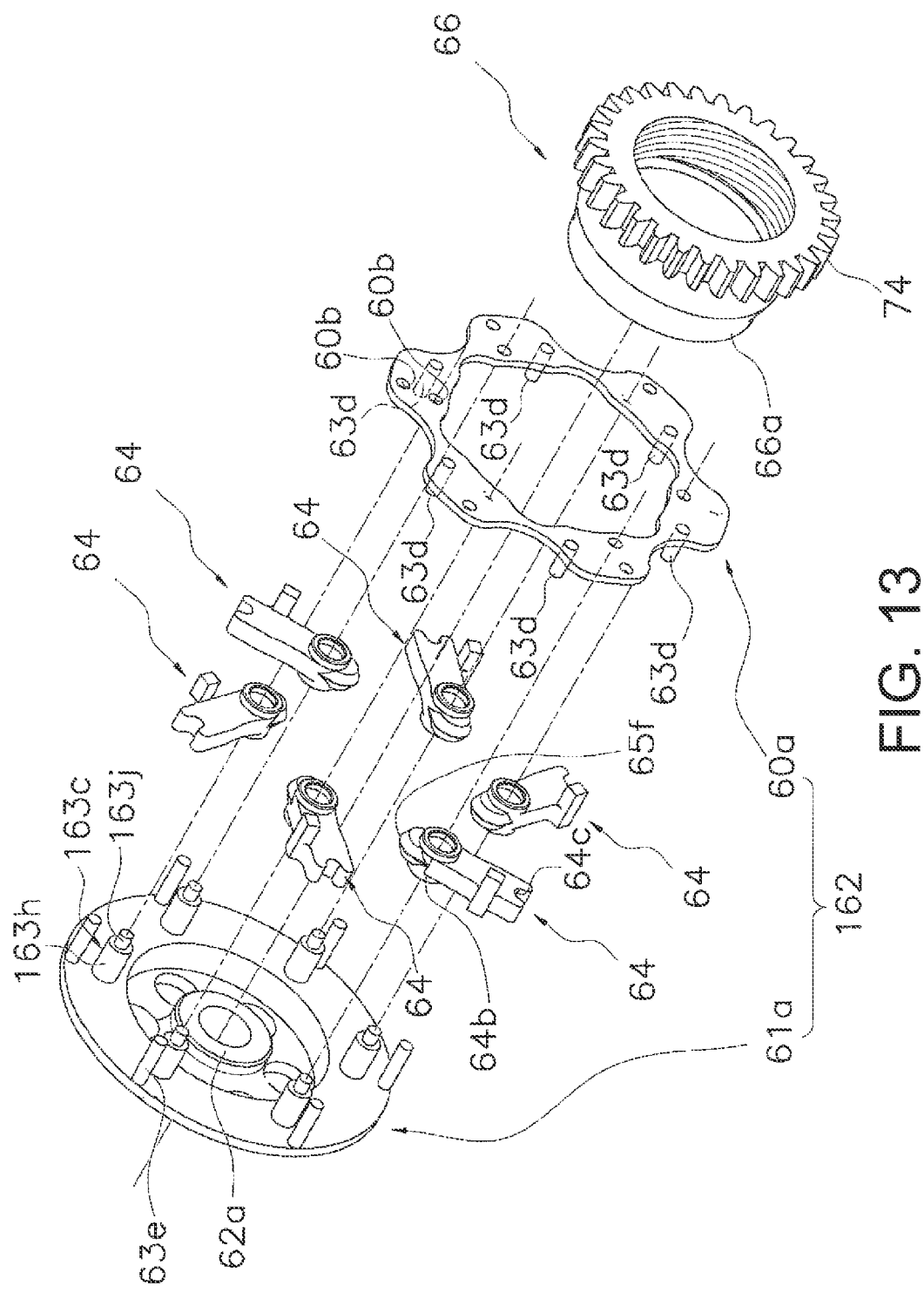
FIG. 13 is an exploded perspective view of the spool braking device according to another embodiment.
Figure 14:
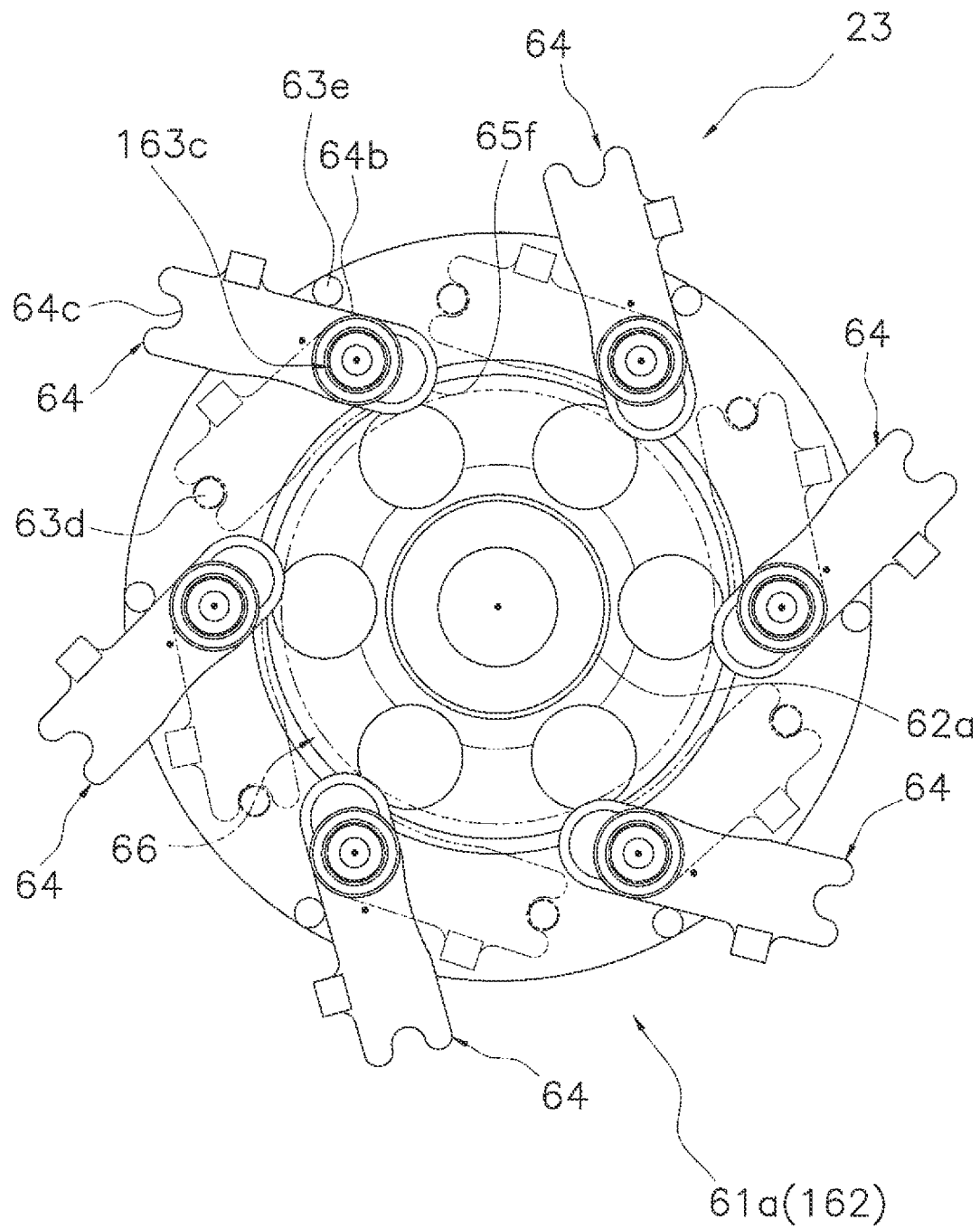
FIG. 14 is a frontal view of the spool braking device according to another embodiment.
Figure 15:
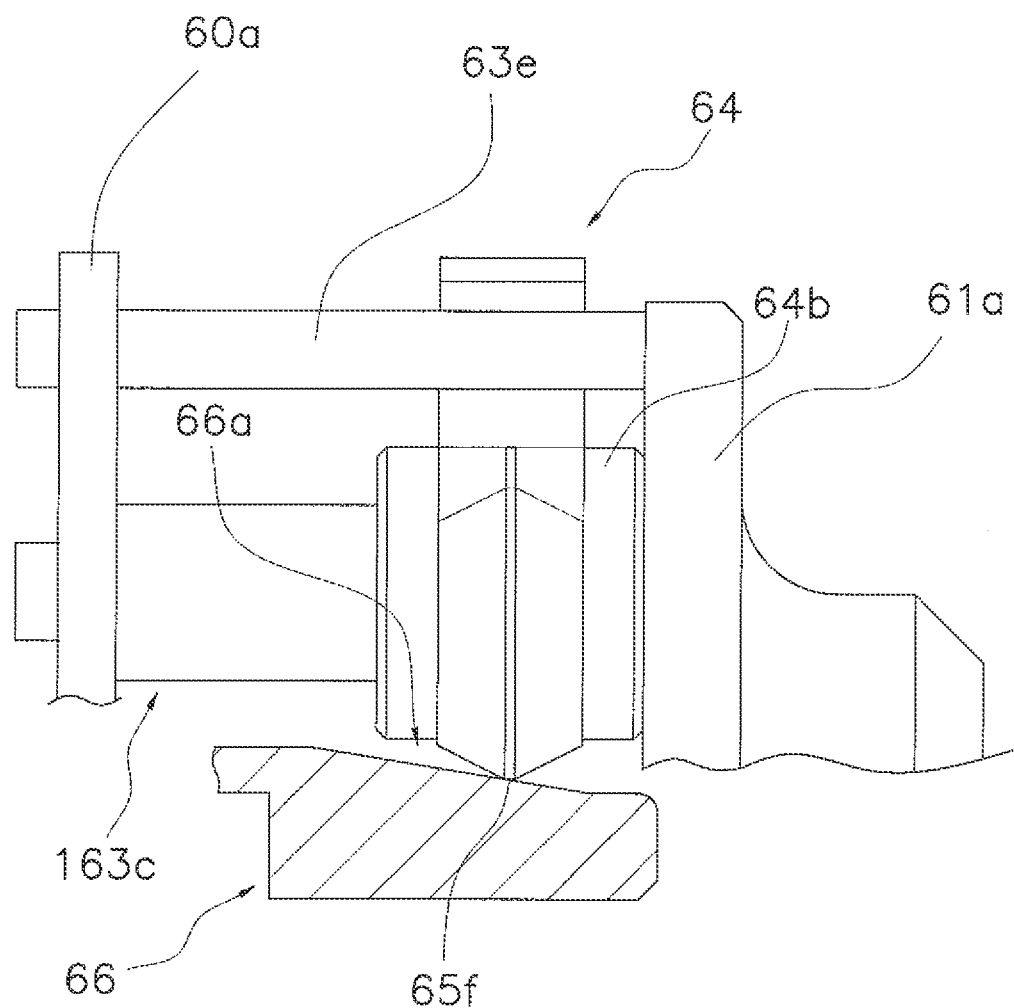
FIG. 15 is a cross-sectional enlarged partial view of a brake drum in contact with the brake shoe in the pivoting position according to another embodiment.

For example, the pivot shaft portion 163c can be configured as shown in FIGS. 13 to 15. Here, a detailed explanation of the same configuration as in the above-described embodiment will be omitted. In other words, the same configurations as those in the above-described embodiment have the same explanations as in the above-described embodiment. Additionally, in FIGS. 13 to 15, the same reference symbols are used for members that are the same as those in the above-described embodiment.

Here, members with different configurations from the above-described embodiment, for example, the rotating member 162, brake shoe 64, and brake drum 66, will be explained.

As shown in FIG. 13, the rotating member 162 comprises a first rotating member 61a and a second rotating member 60a. A tube-like boss portion 62a that is non-rotatably fixed to the spool shaft 20 is formed on the inner peripheral part of the first rotating member 61a. The boss portion 62a is tube-like and is positioned in the axial direction of the spool shaft 20.

The first rotating member 61a comprises a pivot shaft portion 163c and a pivot regulating portion 63e. The pivot shaft portion 163c extends in a direction along the rotational axis of the rotating member 162 (the spool shaft 20 in this example). The pivot shaft portion 163c comprises a large-diameter support section 163h and a small-diameter tip part 163j. The support section 163h is a pivoting shaft that pivotally supports the brake shoe 64. Additionally, the support section 163h movably supports the brake shoe 64 in the axial direction. A second rotating member 60a is detachably mounted on the tip part 163j. The pivot regulating portion 63e functions to regulate the maximum pivoting amount of the brake shoe 64. The pivot regulating portion 63e is disposed essentially parallel with the pivot shaft portion 163c. The pivot regulating portion 63e is a round bar-like part that extends in a direction along the pivot shaft portion 163c. A second rotating member 60a is detachably mounted to the tip part of the pivot regulating portion 63e.

The second rotating member 60a is a member made from a metal such as, for example, an aluminum alloy. The second rotating member 60a comprises a plurality of stopper holes 60b (for example, 12) in which can be inserted the tip part 163j of the pivot shaft portion 163c and the tip part of the pivot regulating portion 63e. The stopper hole 60b is formed to have a slightly smaller diameter than the tip part 163j of the pivot shaft portion 163c and the tip part of the pivot regulating portion 63e. The tip part 163j of the pivot shaft portion 163c and the tip part of the pivot regulating portion 63e are elastically locked to the stopper hole 60b.

The second rotating member 60a comprises a fixing portion 63d. This member also comprises a fixing portion 63d (corresponding to the shoe retaining section 163d (one example of a protruding section) of the above-described embodiment). The fixing portion 63d is integrally formed on the main body section of the second rotating member 60a. The fixing portion 63d is disposed parallel to the spool shaft 20. The fixing portion 63d is a round bar-like part that extends in a direction along the pivot shaft portion 163c. A brake shoe 64 engages with the fixing portion 63d (refer to FIG. 14).

The brake shoe 64 is a long nearly plate-shaped member made from a synthetic resin such as, for example, a polyamide resin and a polyacetal resin, etc. The brake shoe 64 is disposed with a space in between in the rotating direction of the spool 14. The brake shoe 64 pivots around the pivot shaft portion 163c (for example, clockwise in FIG. 14) when the spool 14 rotates due to centrifugal force.

The brake shoe 64 is pivotally mounted to the pivot shaft portion 163c to pivot around the pivot shaft portion 163c, at a pivoting position, for example, on the first rotating member 61a side. Additionally, the brake shoe 64 cannot pivot around the pivot shaft portion 163c while in the non-pivoting position, for example, on side with the second rotating member 60a. Furthermore, the brake shoe 64 can move along the pivot shaft portion 163c from the pivoting position to the non-pivoting position or from the non-pivoting position to the pivoting position.

In FIG. 14, the state in which the brake shoe 64 pivots in the pivoting position is shown by the solid lines, and the state in which the brake shoe 64 is fixed in the non-pivoting position is shown by the chained double-dashed lines.

As shown in FIGS. 13 and 14, the brake shoe 64 comprises a mounting section 64b and an engaging recess 64c. The mounting section 64b is mounted to a support section 163h of the pivot shaft portion 163c. With this, as mentioned above, the brake shoe 64 can pivot around the pivot shaft portion 163c in the pivoting position and can move axially along the pivot shaft portion 163c between the pivoting position and the non-pivoting position.

The engaging recess 64c engages with the fixing portion 63d. Specifically, by moving the brake shoe 64 from the pivoting position to the non-pivoting position along the pivot shaft portion 163c, the engaging recess 64c is engaged with the fixing portion 63d. In this way, by engaging the engaging recess 64c with the fixing portion 63d, the brake shoe 64 is fixed non-pivotally.

Additionally, as shown in FIG. 15, a contacting section 65f that comes into contact with the brake drum 66 is formed on the brake shoe 64. With the brake shoe 64 pivoting in the pivoting position, the contacting section 65f comes into contact with the brake drum 66.

As shown in FIG. 15, the brake drum 66 is disposed inwards in the radial direction of the brake shoe 64. The brake drum 66 is in contact with the pivoting brake shoe 64. The brake drum 66 comprises a tapered surface 66a that tilts toward the spool 14. The tapered surface 66a is formed inwards in the radial direction of the brake shoe 64, and this tapered surface 66a comes into contact with the contacting section 65f of the pivoting brake shoe 64.

In this case, the brake shoe 64 can pivot in the pivoting position. Additionally, as shown in FIG. 14, when the brake shoe 64 pivots in the pivoting position, the brake shoe 64 is positioned to abut the pivot regulating portion 63e. Furthermore, by moving the brake shoe 64 from the pivoting position to the non-pivoting position and engaging the engaging recess 64c with the fixing portion 63d, the brake shoe 64 is disposed in the non-pivoting position. In other words, the brake shoe 64 is non-pivotally supported by the fixing portion 63d in the non-pivoting position.

In this way, even with the configuration shown in FIGS. 13 to 15, by moving the brake shoe 64 in a pivot shaft direction that is different from the direction in which the centrifugal force acts and by engaging the brake shoe with the fixing portion 63d of the rotating member 62, the brake shoe 64 can be non-pivotally fixed. Meanwhile, the brake shoe 64 can be swung by releasing the engagement of the brake shoe 64 and the fixing portion 63d of the rotating member 62.

In this way, by moving the brake shoe 64 in a pivot shaft direction that is different from the direction in which the centrifugal force acts, the brake shoe 64 can be easily switched between the operable state and the inoperable state. Additionally, since the brake shoe 64 can be easily switched between the operable state and the inoperable state by moving the brake shoe in a pivot shaft direction that is different from the direction in which the centrifugal force acts, the brake shoe can be stably operated in the operable state; even if a greater-than-expected amount of centrifugal force is applied to the spool in the inoperable state, the brake shoe can be reliably fixed. Meanwhile, regarding the other effects mentioned for the above-described embodiment, this configuration can obtain the same effects.

Here, an example was shown in which the part where the brake shoe 64 engages with the fixing portion 63d of the rotating member 62, for example, the engaging recess 64c of the brake shoe 64, is formed into a U-shape. Instead of the above, the part where the brake shoe 64 engages with the fixing portion 63d of the rotating member 62 can be a hole. In this case, by engaging this hole with the fixing portion 63d, the brake shoe 64 can be non-pivotally fixed in the non-pivoting position.

What is claimed is:

1. A dual-bearing reel spool braking device configured to brake a spool that is rotatably mounted on a reel body by centrifugal force, the dual-bearing reel spool comprising:
    a brake shoe arranged to apply a braking force to the spool;
    a rotating member configured to rotate in conjunction with the spool, the rotating member including a pivot shaft portion and a fixing portion, the pivot shaft portion pivotally supporting the brake shoe and movably supporting the brake shoe in an axial direction of the pivot shaft portion, the fixing portion selectively engaging the brake shoe and non-pivotally fixing the brake shoe, and
    a brake drum arranged to selectively contact the brake shoe,
    the brake shoe being configured and arranged to selectively contact the brake drum by pivoting due to a centrifugal force.

2. The dual-bearing reel spool braking device as recited in claim 1, wherein
    one of the brake shoe and the rotating member comprises a first guide part, which guides the pivoting of the brake shoe, and
    the other of the brake shoe and the rotating member comprises an engaging section, which engages with and is guided by the first guide part during pivoting of the brake shoe.

3. The dual-bearing reel spool braking device as recited in claim 2, wherein
    the rotating member further comprises a second guide part, which guides movement of the brake shoe in the axial direction of the pivot shaft portion, and the engaging section engages the second guide part when the brake shoe is disposed in a predefined pivoting angle.

4. The dual-bearing reel spool braking device as recited in claim 3, wherein
one of the brake shoe and the rotating member has a movement regulation section which, when the brake shoe engages with the fixing portion, engages with the engaging section to regulate movement of the brake shoe.

5. The dual-bearing reel spool braking device as recited in claim 1, wherein
the pivot shaft portion extends in a direction that is transverse to a rotational axis of the rotating member.

6. The dual-bearing reel spool braking device as recited in claim 1, wherein
the pivot shaft portion extends in a direction parallel to a rotational axis of the rotating member.

7. The dual-bearing reel spool braking device as recited in claim 1, wherein
the pivot shaft portion extends in a direction that is transverse to a rotational axis of the rotating member, and
the brake shoe contacts the brake drum in a state in which at least a part of the brake shoe is pressed by the rotating member in a pivoting position that permits the pivoting of the brake shoe.

8. The dual-bearing reel spool braking device as recited in claim 1, further comprising
an additional brake shoe coupled to the rotating member, and
the rotating member including an additional pivot shaft portion and an additional fixing portion, the additional pivot shaft portion pivotally supporting the additional brake shoe and movably supporting the additional brake shoe in an axial direction of the pivot shaft portion, the additional fixing portion selectively engaging the additional brake shoe and non-pivotally fixing the additional brake shoe.

9. A dual-bearing reel including the dual-bearing reel spool braking device as recited in claim 1, and further comprising:
a reel body; and
the spool rotatably mounted to the reel body, the spool braking device being operatively coupled to the spool.

10. A dual-bearing reel spool braking device configured to brake a spool that is rotatably mounted on a reel body by centrifugal force, the dual-bearing reel spool comprising:
a brake shoe arranged to apply a braking force to the spool;
a rotating member configured to rotate in conjunction with the spool, the rotating member including a pivot shaft portion and a fixing portion, the pivot shaft portion pivotally supporting the brake shoe and movably supporting the brake shoe in an axial direction of the pivot shaft portion, the fixing portion selectively engaging the brake shoe and non-pivotally fixing the brake shoe, and
a brake drum arranged to selectively contact the brake shoe,
the brake shoe being movably arranged along the pivot shaft portion between a pivoting position that permits the pivoting of the brake shoe and a non-pivoting position in which the brake shoe engages with the fixing portion.

11. A dual-bearing reel spool braking device configured to brake a spool that is rotatably mounted on a reel body by centrifugal force, the dual-bearing reel spool comprising:
a brake shoe arranged to apply a braking force to the spool;
a rotating member configured to rotate in conjunction with the spool, the rotating member including a pivot shaft portion and a fixing portion, the pivot shaft portion pivotally supporting the brake shoe and movably supporting the brake shoe in an axial direction of the pivot shaft portion, the fixing portion selectively engaging the brake shoe and non-pivotally fixing the brake shoe, and
a brake drum arranged to selectively contact the brake shoe,
one of the brake shoe and the fixing portion having a protrusion that is substantially parallel with the pivot shaft portion, and
the other of the brake shoe and the fixing portion having a recess that engages with the protruding section.

12. A dual-bearing reel spool braking configured to brake a spool that is rotatably mounted on a reel body by centrifugal force, the dual-bearing reel spool comprising:
a brake shoe arranged to apply a braking force to the spool;
a rotating member configured to rotate in conjunction with the spool, the rotating member including a pivot shaft portion and a fixing portion, the pivot shaft portion pivotally supporting the brake shoe and movably supporting the brake shoe in an axial direction of the pivot shaft portion, the fixing portion selectively engaging the brake shoe and non-pivotally fixing the brake shoe, and
a brake drum arranged to selectively contact the brake shoe,
one of the brake shoe and the fixing portion having a protrusion that is substantially parallel to the pivot shaft portion, and
the other of the brake shoe and the fixing portion having a hole that engages with the protruding section.

* * * * *